United States Patent
Xue et al.

(10) Patent No.: US 11,234,207 B2
(45) Date of Patent: Jan. 25, 2022

(54) POSITIONING INFORMATION TRANSMISSION METHOD, RELATED DEVICE, AND SYSTEM

(71) Applicant: HUAWEI TECHNOLOGIES CO., LTD., Guangdong (CN)

(72) Inventors: Jiantao Xue, Beijing (CN); Kailong Wang, Shenzhen (CN); Yuan Gao, Shenzhen (CN); Jing Han, Beijing (CN); Yueqi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 16/403,117

(22) Filed: May 3, 2019

(65) Prior Publication Data
US 2019/0261305 A1    Aug. 22, 2019

Related U.S. Application Data

(63) Continuation of application No. PCT/CN2016/104791, filed on Nov. 4, 2016.

(51) Int. Cl.
*H04W 64/00* (2009.01)
*G01S 5/00* (2006.01)
(Continued)

(52) U.S. Cl.
CPC .......... *H04W 64/00* (2013.01); *G01S 5/0081* (2013.01); *G01S 5/14* (2013.01); *H04W 4/00* (2013.01); *H04W 4/02* (2013.01)

(58) Field of Classification Search
CPC ......... H04W 64/00; H04W 4/00; H04W 4/02; G01S 5/0081; G01S 5/14
(Continued)

(56) References Cited

U.S. PATENT DOCUMENTS

| 6,011,974 A | 1/2000 | Mats et al. |
| 7,110,774 B1 | 9/2006 | Davis et al. |

(Continued)

FOREIGN PATENT DOCUMENTS

| CN | 1271419 A | 10/2000 |
| CN | 1484769 A | 3/2004 |

(Continued)

OTHER PUBLICATIONS

Extended European Search Report issued in European Application No. 16920618.2 dated Jul. 29, 2019, 12 pages.
(Continued)

*Primary Examiner* — Charles N Appiah
*Assistant Examiner* — Nicole M Louis-Fils
(74) *Attorney, Agent, or Firm* — Fish & Richardson P.C.

(57) ABSTRACT

Embodiments of the present disclosure disclose a positioning information transmission method, a related device, and a system. The positioning information transmission method includes: determining an uplink subframe for carrying an uplink signal and a downlink subframe for carrying a downlink signal; determining first measurement information and second measurement information; and sending the first measurement information and the second measurement information to a positioning server, for locating a terminal device by the positioning server. Positioning accuracy can be improved by using the embodiments of the present disclosure.

10 Claims, 12 Drawing Sheets

(51) Int. Cl.
*H04W 4/02* (2018.01)
*G01S 5/14* (2006.01)
*H04W 4/00* (2018.01)

(58) Field of Classification Search
USPC .......................................................... 455/456
See application file for complete search history.

(56) References Cited

U.S. PATENT DOCUMENTS

| | | | |
|---|---|---|---|
| 2003/0190919 A1 | 10/2003 | Niemenmaa | |
| 2012/0287800 A1 | 11/2012 | Siomina et al. | |
| 2013/0294265 A1 | 11/2013 | Peng et al. | |
| 2014/0171111 A1* | 6/2014 | Xiao | G01S 1/24 455/456.1 |
| 2014/0254412 A1 | 9/2014 | Siomina | |
| 2015/0189610 A1* | 7/2015 | Siomina | H04L 5/14 370/280 |
| 2015/0219750 A1* | 8/2015 | Xiao | G01S 5/0215 342/451 |
| 2017/0288845 A1* | 10/2017 | Axmon | H04W 72/0446 |
| 2017/0294955 A1* | 10/2017 | Tomioka | H04W 56/004 |

FOREIGN PATENT DOCUMENTS

| | | | |
|---|---|---|---|
| CN | 101305531 A | 11/2008 | |
| CN | 101801085 A | 8/2010 | |
| CN | 103200610 A | 7/2013 | |
| CN | 104394590 A | 3/2015 | |
| CN | 104749946 A | 7/2015 | |
| CN | 105208653 A | 12/2015 | |
| CN | 105743626 A | 7/2016 | |
| EP | 1528405 A2 * | 5/2005 | ........... G01S 5/0205 |
| GB | 2215932 A * | 9/1989 | ............ H04W 64/00 |
| JP | 2006504094 A | 2/2006 | |
| JP | 2013167630 A | 8/2013 | |
| JP | 2014158272 A | 8/2014 | |
| WO | 2016043954 A1 | 3/2016 | |
| WO | 2016118054 A1 | 7/2016 | |

OTHER PUBLICATIONS

R4-1609104—Intel Corporation, "Further discussion on eCID positioning for NB-IoT," 3GPP TSG-RAN WG4 Meeting #80bis, Ljubljana, Slovenia, Oct. 10-14, 2016, 6 pages.

Office Action issued in Japanese Application No. 2019-523546 dated Aug. 25, 2020, 19 pages (with English translation).

Office Action issued in Chinese Application No. 201680090551.9 dated Nov. 29, 2019, 14 pages.

3GPP TS 36.211 V14.0.0 (Sep. 2016), "3rd Generation Partnership Project; Technical Specification Group Radio Access Network; Evolved Universal Terrestrial Radio Access (E-UTRA); Physical channels and modulation (Release 14)," Technical Specification, Sep. 2016, 170 pages.

3GPP TS 36.214 V14.0.0 (Sep. 2016), "3rd Generation Partnership Project; Technical Specification Group Radio Access Network; Evolved Universal Terrestrial Radio Access (E-UTRA); Physical layer;Measurements (Release 14)," Technical Specification, Sep. 2016, 20 pages.

3GPP TS 36.355 V13.2.0 (Sep. 2016), "3rd Generation Partnership Project; Technical Specification Group Radio Access Network; Evolved Universal Terrestrial Radio Access (E-UTRA); LTE Positioning Protocol (LPP) (Release 13)," Technical Specification, 141 pages.

3GPP TS 36.455 V13.1.0 (Mar. 2016), "3rd Generation Partnership Project; Technical Specification Group Radio Access Network; Evolved Universal Terrestrial Radio Access (E-UTRA); LTE Positioning Protocol A (LPPa) (Release 13)," Technical Specification, 61 pages.

PCT International Search Report and Written Opinion issued in International PCT/CN2016/104791 dated Aug. 1, 2017, 19 pages (with English translation).

R4-167237—Intel Corporation, "Preliminary Discussion on UE Rx-Tx time difference measurement for NB-IoT," 3GPP TSG-RAN WG4 Meeting #80bis, Ljubljana, Slovenia, Oct. 10-14, 2016, 3 pages.

Office Action issued in Chinese Application No. 201680090551.9 dated Nov. 13, 2020, 6 pages (with English translation).

* cited by examiner

POSITIONING INFORMATION TRANSMISSION METHOD, RELATED DEVICE, AND SYSTEM

CROSS-REFERENCE TO RELATED APPLICATIONS

This application is a continuation of International Application No. PCT/CN2016/104791 filed on Nov. 4, 2016, the disclosure of which is hereby incorporated by reference in its entirety.

TECHNICAL FIELD

The present disclosure relates to the field of communications technologies, and in particular, to a positioning information transmission method, a related device, and a system.

BACKGROUND

With development of communications services, a positioning service plays an important role as an indispensable part of a mobile communications or personal communications service. The positioning service is to obtain position information (longitude and latitude coordinates) of a terminal device (User Equipment, UE) by using a network (such as an LTE network) of a mobile telecom operator, for example, to estimate a distance between a base station and the UE, and determine position information of the UE based on position information of the base station and the distance between the base station and the UE. The distance between the base station and the UE may be obtained by using a difference between an uplink subframe for carrying an uplink signal and a downlink subframe for carrying a downlink signal. However, when the base station fast schedules the uplink subframe or the downlink subframe, the "difference between the uplink subframe for carrying the uplink signal and the downlink subframe for carrying the downlink signal" is variable. In a conventional positioning method, it is assumed that the "difference between the uplink subframe for carrying the uplink signal and the downlink subframe for carrying the downlink signal" is already known to a positioning server, and that the "difference between the uplink subframe for carrying the uplink signal and the downlink subframe for carrying the downlink signal" in the positioning server remains fixed and unchanged. Consequently, the positioning server cannot accurately calculate the distance between the UE and the base station, and positioning accuracy is reduced.

SUMMARY

Embodiments of the present disclosure provide a positioning information transmission method, a related device, and a system, to improve positioning accuracy.

A first aspect of the embodiments of the present disclosure provides a positioning information transmission method. A base station may determine an uplink subframe for carrying an uplink signal, determine a downlink subframe for carrying a downlink signal, determine first measurement information, determine second measurement information, and send the first measurement information and the second measurement information to a positioning server, for locating a terminal device by the positioning server.

The first measurement information includes a difference between a receiving time of the uplink signal and a sending time of the downlink signal, or the first measurement information includes a difference between a receiving time of the downlink signal and a sending time of the uplink signal. The second measurement information is used to indicate a difference between the uplink subframe and the downlink subframe.

Optionally, the difference between the uplink subframe and the downlink subframe is obtained by using a difference between a subframe identifier of the uplink subframe and a subframe identifier of the downlink subframe.

Optionally, the second measurement information may include at least one of the following: the uplink subframe and the downlink subframe; a quantity of times of repeatedly carrying the uplink subframe; a quantity of times of repeatedly carrying the downlink subframe; the difference between the uplink subframe and the downlink subframe; and a configuration (UL/DL configuration) between the uplink subframe and the downlink subframe.

Optionally, before sending the second measurement information to the positioning server, the base station may send identity information to the positioning server; and when receiving a measurement information obtaining request that is fed back by the positioning server in response to the identity information, the base station sends the second measurement information to the positioning server. The identity information is used to indicate that the base station has a capability of sending the second measurement information.

A second aspect of the embodiments of the present disclosure provides a positioning information transmission method. A base station may determine third measurement information, and send the third measurement information to a positioning server, for locating a terminal device by the positioning server. The third measurement information is used to indicate a distance between the base station and the terminal device, or the third measurement information is used to indicate a transmission time of an uplink signal and/or a transmission time of a downlink signal.

Optionally, a specific manner in which the base station determines the third measurement information may be: receiving, by the base station, the third measurement information sent by the terminal device.

Optionally, a specific manner in which the base station determines the third measurement information may be: determining, by the base station, first measurement information, receiving second measurement information sent by the terminal device, and calculating the third measurement information based on the first measurement information and the second measurement information. The first measurement information includes a difference between a receiving time of the uplink signal and a sending time of the downlink signal, or the first measurement information includes a difference between a receiving time of the downlink signal and a sending time of the uplink signal. The second measurement information is used to indicate a difference between an uplink subframe for carrying the uplink signal and a downlink subframe for carrying the downlink signal.

Optionally, the difference between the uplink subframe and the downlink subframe is obtained by using a difference between a subframe identifier of the uplink subframe and a subframe identifier of the downlink subframe.

Optionally, the second measurement information may include at least one of the following: the uplink subframe and the downlink subframe; a quantity of times of repeatedly carrying the uplink subframe; a quantity of times of repeatedly carrying the downlink subframe; the difference between the uplink subframe and the downlink subframe; and a configuration (UL/DL configuration) between the uplink subframe and the downlink subframe.

Optionally, before sending the third measurement information to the positioning server, the base station may send identity information to the positioning server; and when receiving a measurement information obtaining request that is fed back by the positioning server in response to the identity information, the base station may send the third measurement information to the positioning server. The identity information is used to indicate that the base station has a capability of sending the third measurement information.

Optionally, the third measurement information includes a sum of the transmission time of the uplink signal and the transmission time of the downlink signal, the transmission time of the uplink signal, the transmission time of the downlink signal, and a round-trip distance between the base station and the terminal device or a one-way distance between the base station and the terminal device.

A third aspect of the embodiments of the present disclosure provides a positioning information transmission method. A terminal device may determine first measurement information, and send the first measurement information to a positioning server, for locating the terminal device by the positioning server. The first measurement information includes a difference between a receiving time of a downlink signal and a sending time of an uplink signal.

Optionally, the terminal device may further determine an uplink subframe for carrying the uplink signal, determine a downlink subframe for carrying the downlink signal, determine second measurement information, calculate third measurement information based on the first measurement information and the second measurement information, and send the third measurement information to the positioning server, for locating the terminal device by the positioning server. The second measurement information is used to indicate a difference between the uplink subframe and the downlink subframe. The third measurement information is used to indicate a distance between a base station and the terminal device, or the third measurement information is used to indicate a transmission time of the uplink signal and/or a transmission time of the downlink signal.

Optionally, the terminal device may further determine an uplink subframe for carrying the uplink signal, determine a downlink subframe for carrying the downlink signal, determine second measurement information, and send the second measurement information to the positioning server. The second measurement information is used to indicate a difference between the uplink subframe and the downlink subframe.

Optionally, the terminal device may further determine an uplink subframe for carrying the uplink signal, determine a downlink subframe for carrying the downlink signal, determine second measurement information, and send the second measurement information to a base station. The second measurement information is used to indicate a difference between the uplink subframe and the downlink subframe.

Optionally, the difference between the uplink subframe and the downlink subframe is obtained by using a difference between a subframe identifier of the uplink subframe and a subframe identifier of the downlink subframe.

Optionally, the second measurement information includes at least one of the following: the uplink subframe and the downlink subframe; a quantity of times of repeatedly carrying the uplink subframe; a quantity of times of repeatedly carrying the downlink subframe; the difference between the uplink subframe and the downlink subframe; and a configuration (UL/DL configuration) between the uplink subframe and the downlink subframe.

Optionally, before sending the second measurement information to the positioning server, the terminal device may further send identity information to the positioning server; and when receiving a measurement information obtaining request that is fed back by the positioning server in response to the identity information, the terminal device sends the second measurement information to the positioning server. The identity information is used to indicate that the terminal device has a capability of sending the second measurement information.

Optionally, before sending the third measurement information to the positioning server, the terminal device may further send identity information to the positioning server; and when receiving a measurement information obtaining request that is fed back by the positioning server in response to the identity information, the terminal device sends the third measurement information to the positioning server. The identity information is used to indicate that the terminal device has a capability of sending the third measurement information.

Optionally, the third measurement information includes a sum of the transmission time of the uplink signal and the transmission time of the downlink signal, the transmission time of the uplink signal, the transmission time of the downlink signal, and a round-trip distance between the base station and the terminal device or a one-way distance between the base station and the terminal device.

A fourth aspect of the embodiments of the present disclosure provides a positioning information transmission method. A positioning server may receive first measurement information and second measurement information, and locate a terminal device based on the first measurement information and the second measurement information. The first measurement information includes a difference between a receiving time of an uplink signal and a sending time of a downlink signal, or the first measurement information includes a difference between a receiving time of a downlink signal and a sending time of an uplink signal. The second measurement information is used to indicate a difference between an uplink subframe for carrying the uplink signal and a downlink subframe for carrying the downlink signal.

Optionally, the positioning server may further receive third measurement information, and locate the terminal device based on the third measurement information. The third measurement information is used to indicate a distance between a base station and the terminal device, or the third measurement information is used to indicate a transmission time of the uplink signal and/or a transmission time of the downlink signal.

Optionally, the second measurement information includes at least one of the following: the uplink subframe and the downlink subframe; a quantity of times of repeatedly carrying the uplink subframe; a quantity of times of repeatedly carrying the downlink subframe; the difference between the uplink subframe and the downlink subframe; and a configuration (UL/DL configuration) between the uplink subframe and the downlink subframe.

Optionally, the third measurement information includes a sum of the transmission time of the uplink signal and the transmission time of the downlink signal, the transmission time of the uplink signal, the transmission time of the downlink signal, and a round-trip distance between the base station and the terminal device or a one-way distance between the base station and the terminal device.

A fifth aspect of the embodiments of the present disclosure provides a computer storage medium, where the computer storage medium stores a program. When the program is executed, all or some steps of the positioning information transmission method provided in the first aspect of the embodiments of the present disclosure are performed.

A sixth aspect of the embodiments of the present disclosure provides a computer storage medium, where the computer storage medium stores a program. When the program is executed, all or some steps of the positioning information transmission method provided in the second aspect of the embodiments of the present disclosure are included.

A seventh aspect of the embodiments of the present disclosure provides a computer storage medium, where the computer storage medium stores a program. When the program is executed, all or some steps of the positioning information transmission method provided in the third aspect of the embodiments of the present disclosure are included.

An eighth aspect of the embodiments of the present disclosure provides a computer storage medium, where the computer storage medium stores a program. When the program is executed, all or some steps of the positioning information transmission method provided in the fourth aspect of the embodiments of the present disclosure are included.

A ninth aspect of the embodiments of the present disclosure discloses a base station. The base station includes modules configured to perform the positioning information transmission method disclosed in the first aspect of the embodiments of the present disclosure.

A tenth aspect of the embodiments of the present disclosure discloses a base station. The base station includes a processor, a memory, a transmitter, and a receiver, where the memory stores a set of program code, and the processor calls the program code stored in the memory to perform the following operations:

determining an uplink subframe for carrying an uplink signal;

determining a downlink subframe for carrying a downlink signal;

determining first measurement information, where the first measurement information includes a difference between a receiving time of the uplink signal and a sending time of the downlink signal, or the first measurement information includes a difference between a receiving time of the downlink signal and a sending time of the uplink signal;

determining second measurement information, where the second measurement information is used to indicate a difference between the uplink subframe and the downlink subframe; and sending the first measurement information and the second measurement information to a positioning server, for locating a terminal device by the positioning server.

An eleventh aspect of the embodiments of the present disclosure discloses a base station. The base station includes modules configured to perform the positioning information transmission method disclosed in the second aspect of the embodiments of the present disclosure.

A twelfth aspect of the embodiments of the present disclosure discloses a base station. The base station includes a processor, a memory, a transmitter, and a receiver, where the memory stores a set of program code, and the processor calls the program code stored in the memory to perform the following operations:

determining third measurement information, where the third measurement information is used to indicate a distance between the base station and a terminal device, or the third measurement information is used to indicate a transmission time of an uplink signal and/or a transmission time of a downlink signal; and sending the third measurement information to a positioning server, for locating the terminal device by the positioning server.

A thirteenth aspect of the embodiments of the present disclosure discloses a terminal device. The terminal device includes modules configured to perform the positioning information transmission method disclosed in the third aspect of the embodiments of the present disclosure.

A fourteenth aspect of the embodiments of the present disclosure discloses a terminal device. The terminal device includes a processor, a memory, a transmitter, and a receiver, where the memory stores a set of program code, and the processor calls the program code stored in the memory to perform the following operations:

determining first measurement information, where the first measurement information includes a difference between a receiving time of a downlink signal and a sending time of an uplink signal; and sending the first measurement information to a positioning server, for locating the terminal device by the positioning server.

A fifteenth aspect of the embodiments of the present disclosure discloses a positioning server. The positioning server includes modules configured to perform the positioning information transmission method disclosed in the fourth aspect of the embodiments of the present disclosure.

A sixteenth aspect of the embodiments of the present disclosure discloses a positioning server. The positioning server includes a processor, a memory, a transmitter, and a receiver, where the memory stores a set of program code, and the processor calls the program code stored in the memory to perform the following operations:

receiving first measurement information and second measurement information, where the first measurement information includes a difference between a receiving time of the uplink signal and a sending time of the downlink signal, or the first measurement information includes a difference between a receiving time of the downlink signal and a sending time of the uplink signal, and the second measurement information is used to indicate a difference between an uplink subframe for carrying the uplink signal and a downlink subframe for carrying the downlink signal; and locating a terminal device based on the first measurement information and the second measurement information.

A seventeenth aspect of the embodiments of the present disclosure discloses a positioning information transmission system. The positioning information transmission system includes the base station disclosed in the tenth aspect of the embodiments of the present disclosure, the terminal device disclosed in the fourteenth aspect of the embodiments of the present disclosure, and the positioning server disclosed in the sixteenth aspect of the embodiments of the present disclosure.

An eighteenth aspect of the embodiments of the present disclosure discloses a positioning information transmission system. The positioning information transmission system includes the base station disclosed in the twelfth aspect of the embodiments of the present disclosure, the terminal device disclosed in the fourteenth aspect of the embodiments of the present disclosure, and the positioning server disclosed in the sixteenth aspect of the embodiments of the present disclosure.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may derive other drawings from these accompanying drawings without creative efforts.

DESCRIPTION OF EMBODIMENTS

Figure 1:
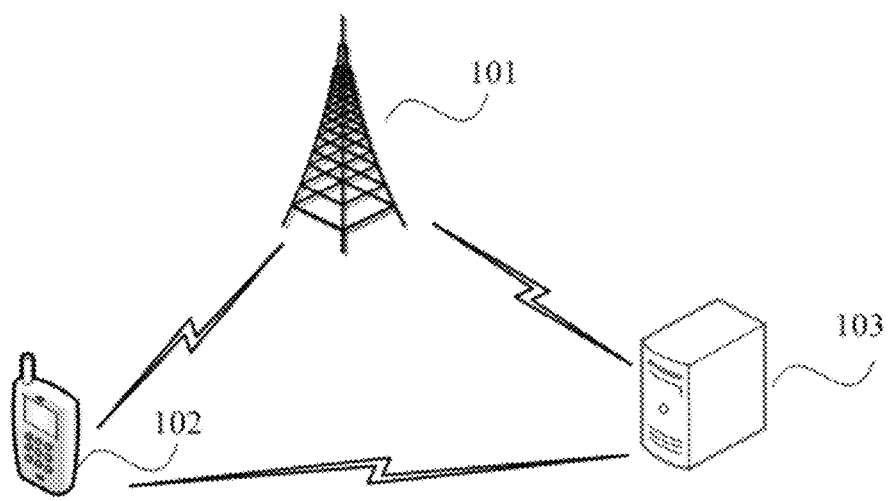
FIG. 1 is a schematic architectural diagram of a positioning information transmission system according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In a conventional enhanced cell ID positioning (Enhanced Cell ID positioning, E-CID) technology, a distance between UE and a base station may be determined by using UE Rx-Tx measurement (a difference between a transmission time at which the UE transmits an uplink signal and a receiving time at which the UE receives a downlink signal) or eNB Rx-Tx measurement (a difference between a transmission time at which the base station transmits a downlink signal and a receiving time at which the base station receives an uplink signal). Specifically, the distance between the UE and the base station is equal to: (eNB Rx-Tx time difference–(Uplink subframe in which the base station receives the uplink signal–Downlink subframe in which the base station transmits the downlink signal))/(2*Light velocity). However, for a cellular-based Narrow Band Internet of Things (Narrow Band Internet of Things, NB-IoT) mode, an HD-FDD mode, a time division duplex (Time Division Duplex, TDD) mode, or the like, the base station may fast schedule the subframe in which the uplink signal is located or the subframe in which the downlink signal is located. As a result, the "difference between the uplink subframe in which the base station receives the uplink signal and the downlink subframe in which the base station transmits the downlink signal" is variable. In the conventional enhanced cell ID positioning technology, it is assumed that the "difference between the uplink subframe in which the base station receives the uplink signal and the downlink subframe in which the base station transmits the downlink signal" is already known to a positioning server, and that the "difference between the uplink subframe in which the base station receives the uplink signal and the downlink subframe in which the base station transmits the downlink signal" remains fixed and unchanged. Consequently, the positioning server cannot accurately calculate the distance between the UE and the base station, and positioning accuracy is reduced. The "difference" in the present disclosure, for example, a difference between A and B, includes a difference obtained after B is subtracted from A or a difference obtained after A is subtracted from B, and no distinction is made. The "subframe" in the present disclosure includes frame concepts, such as a radio frame, a super frame, a hyperframe, a subframe, and a frame, in different communications systems.

An embodiment of the present disclosure provides a positioning information transmission method. A base station may determine an uplink subframe for carrying an uplink signal and a downlink subframe for carrying a downlink signal, and determine first measurement information and second measurement information; the base station may send the first measurement information and the second measurement information to a positioning server; the positioning server may calculate a distance between the base station and a terminal device based on the first measurement information and the second measurement information; and the positioning server may further locate the terminal device based on the calculated distance between the base station and the terminal device, thereby improving positioning accuracy.

Based on the foregoing principle, an embodiment of the present disclosure provides a schematic architectural diagram of a positioning information transmission system.

Referring to FIG. 1, an architecture of the positioning information transmission system may include at least: a base station 101, a terminal device 102, and a positioning server 103. For example, a communications interface between the positioning server 103 and the base station 101 may be 3GPP 36.455 LPPa, and a communications interface between the positioning server 103 and the terminal device 102 may be 3GPP 36.355 LPP.

A data flow between the base station 101 and the terminal device 102 may be as follows: The terminal device 102 sends an uplink signal to the base station 101, and the base station 101 sends a downlink signal to the terminal device 102. The terminal device 102 (or the base station 101) may obtain first measurement information based on a sending time at which the terminal device 102 sends the uplink signal and a receiving time at which the terminal device 102 receives the downlink signal, where the first measurement information includes a difference between the receiving time of the downlink signal and the sending time of the uplink signal. The terminal device 102 (or the base station 101) may further obtain second measurement information based on an uplink subframe in which the terminal device 102 sends the uplink signal and a downlink subframe in which the terminal device 102 receives the downlink signal, where the second measurement information is used to indicate a difference between the downlink subframe and the uplink subframe. The terminal device 102 (or the base station 101) sends the first measurement information and the second measurement information to the positioning server 103. The positioning server 103 may obtain a distance between the base station 101 and the terminal device 102 based on the first measurement information and the second measurement information, and the positioning server 103 may further locate the terminal device 102 based on the distance between the base station 101 and the terminal device 102. Further, optionally, after obtaining the first measurement information and the second measurement information, the terminal device 102 (or the base station 101) may obtain third measurement information based on the first measurement information and the second measurement information, where the third measurement information is used to indicate the distance between the base station 101 and the terminal device 102 or a round-trip distance between the base station 101 and the terminal device 102. The terminal device 102 (or the base station 101) may send the third measurement information to the positioning server 103, and the positioning server 103 may locate the terminal device 102 based on the third measurement information. Further, optionally, the third measurement information may be used to indicate a transmission time of the uplink signal and/or a transmission time of the downlink signal, or a round-trip transmission time. After the terminal device 102 (or the base station 101) sends the third measurement information to the positioning server 103, the positioning server 103 may obtain the distance between the base station 101 and the terminal device 102 based on the third measurement information, and the positioning server 103 may further locate the terminal device 102 based on the distance between the base station 101 and the terminal device 102.

Optionally, a data flow between the base station 101 and the terminal device 102 may be as follows: The base station 101 sends a downlink signal to the terminal device 102, and the terminal device 102 sends the uplink signal to the base station 101. The base station 101 may obtain first measurement information based on a sending time at which the base station 101 sends the downlink signal and a receiving time at which the base station 101 receives the uplink signal, where the first measurement information includes a difference between the receiving time of the uplink signal and the sending time of the downlink signal. The base station 101 may further obtain second measurement information based on a downlink subframe in which the base station 101 sends the downlink signal and an uplink subframe in which the base station 101 receives the uplink signal, where the second measurement information is used to indicate a difference between the uplink subframe and the downlink subframe. The base station 101 sends the first measurement information and the second measurement information to the positioning server 103. The positioning server 103 may obtain, based on the first measurement information and the second measurement information, a distance between the base station 101 and the terminal device 102 or a round-trip distance between the base station 101 and the terminal device 102. The positioning server 103 may further locate the terminal device 102 based on the distance between the base station 101 and the terminal device 102. Further, optionally, after obtaining the first measurement information and the second measurement information, the base station 101 may obtain third measurement information based on the first measurement information and the second measurement information, where the third measurement information is used to indicate the distance between the base station 101 and the terminal device 102 or the round-trip distance between the base station 101 and the terminal device 102. The base station 101 may send the third measurement information to the positioning server 103, and the positioning server 103 may locate the terminal device 102 based on the third measurement information. Further, optionally, the third measurement information may be used to indicate a transmission time of the uplink signal and/or a transmission time of the downlink signal, or a round-trip transmission time. After the base station 101 sends the third measurement information to the positioning server 103, the positioning server 103 may obtain the distance between the base station 101 and the terminal device 102 based on the third measurement information, and the positioning server 103 may further locate the terminal device 102 based on the distance between the base station 101 and the terminal device 102.

Before the specific embodiments of the present disclosure are described, concepts that may be used in the present disclosure, such as a base station, a terminal device, and a positioning server, are briefly described first. The base station may be a macro base station; an LMU; a femtocell; a picocell base station; a pico remote radio unit (pico Remote Radio Unit, pRRU), a remote radio unit (Remote Radio Head, RRH), and the like that belong to a same macro base station; or a pRRU, an RRH, and the like that belong to different macro base stations. The LMU is a logical entity, and may share a device with a base station, or may be an independent network element device, and is used in an Uplink Time Difference of Arrival (Uplink Time Difference of Arrival, UTDOA) technology, to participate in positioning and receive a sounding reference signal (Sounding Reference Signal, SRS) sent by UE. The terminal device may also be referred to as UE, a mobile station, an access terminal, a subscriber unit, a subscriber station, a mobile station, a remote station, a remote terminal, a mobile device, a terminal, a wireless communications device, a user agent, a user apparatus, or the like; and may be specifically any one of a station (Station, ST) in a WLAN, a cellular phone, a cordless telephone set, a Session Initiation Protocol (Session Initiation Protocol, SIP) phone, a wireless local loop (Wireless Local Loop, WLL) station, a personal digital assistant (Personal Digital Assistant, PDA), a handheld device or a computing device having a wireless communication function, another processing device connected to a wireless modem, an in-vehicle device, a wearable device, a mobile station on a future 5G network, a terminal device on a future evolved PLMN network, and the like. The positioning server (Enhanced Serving Mobile Location Center, E-SMLC) is a generic name of all logical entities that are responsible for positioning in a communications system.

Before the specific embodiments of the present disclosure are described, concepts that may be used in the present disclosure, such as an uplink signal, a downlink signal, an uplink subframe, or a downlink subframe, are briefly described first.

Signals transmitted between UE and a base station may be classified into an uplink signal and a downlink signal. The uplink signal is a signal sent by the UE to the base station, and the downlink signal is a signal sent by the base station to the UE. A subframe in which the base station receives the uplink signal sent by the UE may be referred to as an uplink subframe for carrying the uplink signal. Specifically, the base station may receive a subframe number of the subframe in which the uplink signal sent by the UE is located, for example, system frame number (System Frame Number, SFN) information and subframe number information. A subframe in which the base station sends the downlink signal may be referred to as a downlink subframe for carrying the downlink signal. Specifically, the base station may obtain a subframe number of the subframe in which the downlink signal sent to the UE is located, for example, SFN information and subframe number information. A subframe in which the UE receives the downlink signal sent by the base station may be referred to as a downlink subframe for carrying the downlink signal. Specifically, the UE may receive a subframe number of the subframe in which the downlink signal sent by the base station is located, for example, SFN information and subframe number information. A subframe in which the UE sends the uplink signal may be referred to as an uplink subframe for carrying the uplink signal. Specifically, the UE may obtain a subframe number of the subframe in which the uplink signal sent to the base station is located, for example, SFN information and subframe number information. Generally, the subframe in which the UE receives the downlink signal is the same as the subframe in which the base station sends the downlink signal, and the subframe in which the UE sends the uplink signal is the same as the subframe in which the base station receives the uplink signal.

One system radio frame may include several subframes, a subframe length of a carrier may be 15 kHz*2^n (where 2^n is 2 to the power of n), and a subframe length corresponding to the system radio frame is 1/(2^n) ms, where n is an integer. In other words, a plurality of transmission time units such as 0.5 ms, 0.25 ms, and 0.125 ms are supported. Different subframes correspond to different subframe identifiers, such as subframe numbers. Because naming manners and components of frames in different communications systems are different, the "subframe" in the present disclosure includes frame concepts, such as a radio frame, a super frame, a hyperframe, a subframe, and a frame, in different communications systems.

A distance between the base station and the UE may be calculated by using the following formula:

Distance between the UE and the base station=(eNB Rx-Tx time difference−(Subframe in which the base station receives the uplink signal−Subframe in which the base station transmits the downlink signal))/(2*Light velocity).

eNB Rx-Tx measurement is a difference between a sending time at which the base station sends the downlink signal and a receiving time at which the base station receives the uplink signal; eNB Rx-Tx time difference−(Subframe in which the base station receives the uplink signal−Subframe in which the base station transmits the downlink signal) is a sum of a transmission time of the uplink signal and a transmission time of the downlink signal; (eNB Rx-Tx time difference−(Subframe in which the base station receives the uplink signal−Subframe in which the base station transmits the downlink signal))/2 is the transmission time of the uplink signal or the transmission time of the downlink signal; (eNB Rx-Tx time difference−(Subframe in which the base station receives the uplink signal−Subframe in which the base station transmits the downlink signal))/(2*Light velocity) is a one-way distance between the base station and the UE; and (eNB Rx-Tx time difference−(Subframe in which the base station receives the uplink signal−Subframe in which the base station transmits the downlink signal))/Light velocity is a round-trip distance between the base station and the UE.

Optionally, the distance between the base station and the UE may be calculated by using the following formula:

Distance between the UE and the base station=(UE Rx-Tx time difference−(Subframe in which the UE receives the downlink signal−Subframe in which the UE sends the uplink signal))/(2*Light velocity).

UE Rx-Tx measurement is a difference between a receiving time at which the UE receives the downlink signal and a sending time at which the UE sends the uplink signal; UE Rx-Tx time difference−(Subframe in which the UE receives the downlink signal−Subframe in which the UE sends the uplink signal) is a sum of a transmission time of the uplink signal and a transmission time of the downlink signal; (UE Rx-Tx time difference−(Subframe in which the UE receives the downlink signal−Subframe in which the UE sends the uplink signal))/2 is the transmission time of the uplink signal or the transmission time of the downlink signal; (UE Rx-Tx time difference−(Subframe in which the UE receives the downlink signal−Subframe in which the UE sends the uplink signal))/(2*Light velocity) is a one-way distance between the base station and the UE; and (UE Rx-Tx time difference−(Subframe in which the UE receives the downlink signal−Subframe in which the UE sends the uplink signal))/Light velocity is a round-trip distance between the base station and the UE.

Figure 2:
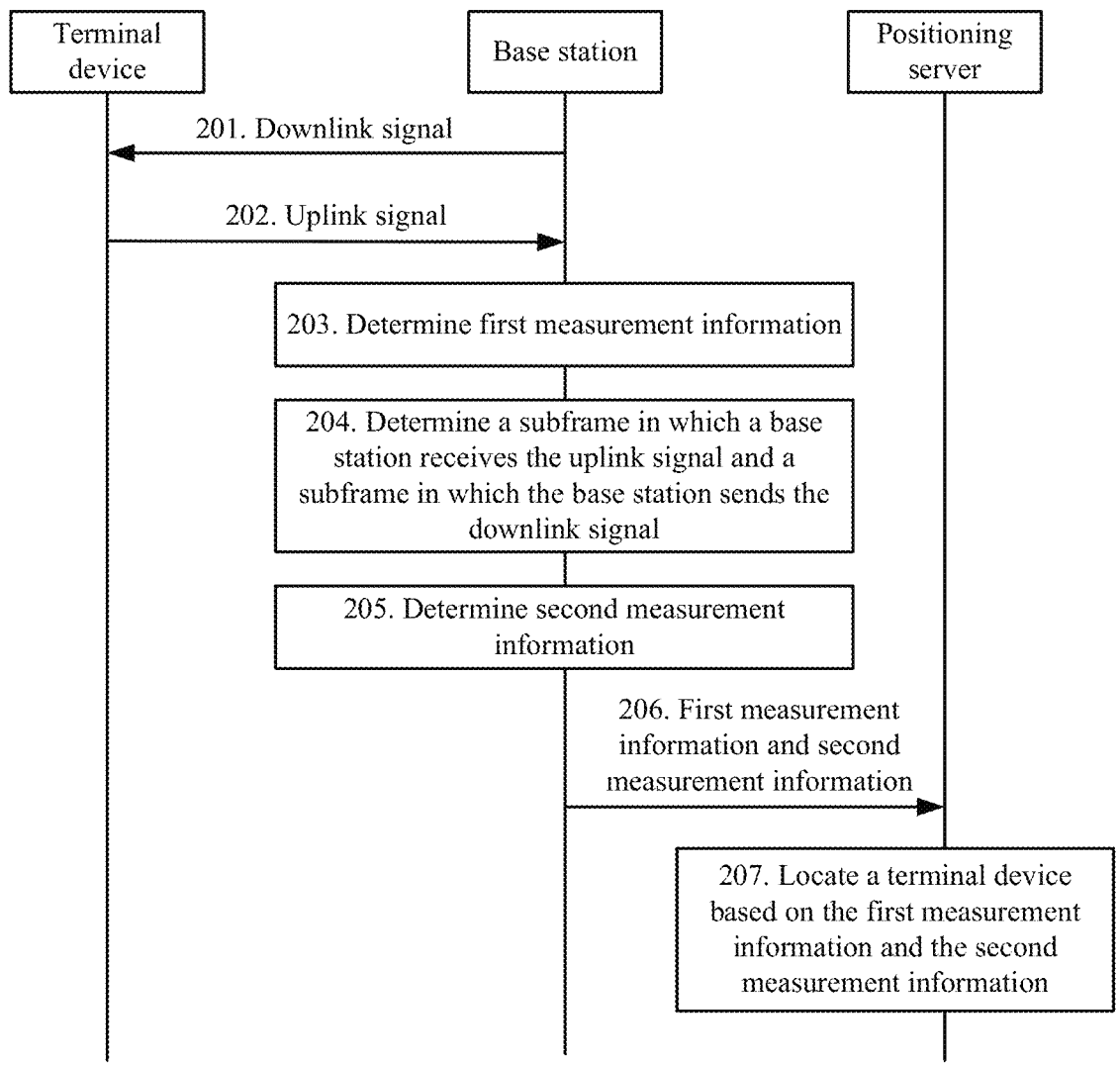
FIG. 2 is a schematic flowchart of a positioning information transmission method according to an embodiment of the present disclosure.

Based on the schematic architectural diagram of the positioning information transmission system shown in FIG. 1, FIG. 2 is a schematic flowchart of a positioning information transmission method according to an embodiment of the present disclosure. As shown in FIG. 2, the positioning information transmission method in this embodiment of the present disclosure may include the following steps.

S201. A base station sends a downlink signal to a terminal device.

In specific implementation, the base station may send a downlink signal to the terminal device at an interval of preset duration, and receive an uplink signal fed back by the terminal device. After determining first measurement information and second measurement information, the base station may send the first measurement information and the second measurement information to a positioning server, for locating the terminal device by the positioning server.

Optionally, after receiving a request for locating the terminal device, the positioning server may configure the base station to measure an eNB Rx-Tx time difference. In this case, the base station may send the downlink signal to the terminal device.

Optionally, the positioning server may inquire whether the base station has a capability of reporting the second measurement information. When the base station reports, to the positioning server, that the base station has the capability of reporting the second measurement information, the positioning server may send a second measurement information obtaining request to the base station, and the base station may send the downlink signal to the terminal device in response to the second measurement information obtaining request. Optionally, the base station may alternatively send, to the positioning server in response to the second measurement information obtaining request, second measurement information that is obtained most recently.

S202. The terminal device generates an uplink signal, and sends the uplink signal to the base station.

After receiving the downlink signal, the terminal device can process the downlink signal, generate an uplink signal, and then send the uplink signal to the base station. A period from a time at which the terminal device receives the downlink signal to a time at which the terminal device sends the uplink signal may be duration in which the terminal device processes the downlink signal, where the processing duration may be obtained by using a difference between a subframe in which the terminal device sends the uplink signal and a subframe in which the terminal device receives the downlink signal. For example, when a subframe number of the subframe in which the terminal device receives the downlink signal is 2, a subframe number of the subframe in which the terminal device sends the uplink signal is 4, and a subframe length of a first subframe is 0.125 ms, the terminal device may determine that the duration in which the terminal device processes the downlink signal is (4−2) *0.125=0.25 ms.

S203. The base station determines first measurement information, where the first measurement information includes a difference between a receiving time of the uplink signal and a sending time of the downlink signal.

The base station may determine the first measurement information, where the first measurement information may include the difference between the receiving time of the uplink signal and the sending time of the downlink signal. For example, if the receiving time at which the base station receives the uplink signal is 10:30, and the sending time at which the base station sends the downlink signal is 10:10, the base station may determine that the first measurement information is 20 min.

S204. The base station determines a subframe in which the base station receives the uplink signal and a subframe in which the base station sends the downlink signal.

After sending the downlink signal to the terminal device, the base station may determine the subframe in which the base station sends the downlink signal, for example, a subframe number of the subframe in which the base station sends the downlink signal. In addition, after receiving the uplink signal sent by the terminal device, the base station may determine the subframe in which the base station receives the uplink signal, for example, a subframe number of the subframe in which the base station receives the uplink signal.

It needs to be noted that, this embodiment of the present disclosure does not limit a time sequence based on which the base station determines the subframe in which the base station receives the uplink signal and the base station determines the subframe in which the base station sends the downlink signal. For example, the base station may determine the subframe in which the base station sends the downlink signal after determining the subframe in which the base station receives the uplink signal; for another example, the base station may determine the subframe in which the base station receives the uplink signal after determining the subframe in which the base station sends the downlink signal; and for another example, the base station may simultaneously determine the subframe in which the base station receives the uplink signal and the subframe in which the base station sends the downlink signal, and this is not limited by this embodiment of the present disclosure.

S205. The base station determines second measurement information, where the second measurement information is used to indicate a difference between the subframe in which the base station receives the uplink signal and the subframe in which the base station sends the downlink signal.

After determining the subframe in which the base station receives the uplink signal and the subframe in which the base station sends the downlink signal, the base station may determine the second measurement information, where the second measurement information is used to indicate the difference between the subframe in which the base station receives the uplink signal and the subframe in which the base station sends the downlink signal. For example, the second measurement information may include the subframe number of the subframe in which the base station receives the uplink signal and the subframe number of the subframe in which the base station sends the downlink signal. For another example, the second measurement information may include the difference between the subframe in which the base station receives the uplink signal and the subframe in which the base station sends the downlink signal. For example, when the subframe number of the subframe in which the base station sends the downlink signal is 2, the subframe number of the subframe in which the base station receives the uplink signal is 4, and a subframe length of a first subframe is 0.125 ms, the base station may determine that the difference between the subframe in which the base station receives the uplink signal and the subframe in which the base station sends the downlink signal is (4−2) *0.125=0.25 ms. In other words, the duration in which the terminal device processes the downlink signal is 0.25 ms. It needs to be noted that an execution sequence of step S203 and step S205 is not limited in this embodiment of the present disclosure. For example, the base station may perform step S203 after performing step S205.

Optionally, the second measurement information may include at least one of the following: an uplink subframe and/or a downlink subframe; a quantity of times of repeatedly carrying the uplink subframe; a quantity of times of repeatedly carrying the downlink subframe; a difference between the uplink subframe and the downlink subframe; a configuration (UL/DL configuration) between the uplink subframe and the downlink subframe; configuration information of the uplink subframe and/or configuration information of the downlink subframe, such as a bit map; configuration information of an uplink resource element (resource element) and/or configuration information of a downlink resource element, such as a bit map; and configuration information of an uplink resource block (resource block) and/or configuration information of a downlink resource block, such as a bit map.

S206. The base station sends the first measurement information and the second measurement information to a positioning server.

After determining the first measurement information and the second measurement information, the base station may send the first measurement information and the second measurement information to the positioning server by using a communications interface between the base station and the positioning server.

S207. The positioning server locates the terminal device based on the first measurement information and the second measurement information.

After receiving the first measurement information and the second measurement information by using the communications interface between the base station and the positioning server, the positioning server may obtain a distance between the terminal device and the base station by using the following formula: (eNB Rx-Tx time difference−(Subframe in which the base station receives the uplink signal−Subframe in which the base station transmits the downlink signal))/(2*Light velocity); and then locate the terminal device based on the distance between the terminal device and the base station.

In the positioning information transmission method shown in FIG. 2, the base station determines the first measurement information, where the first measurement information includes the difference between the receiving time of the uplink signal and the sending time of the downlink signal, and determines the second measurement information, where the second measurement information is used to indicate the difference between the uplink subframe and the downlink subframe; and the base station sends the first measurement information and the second measurement information to the positioning server, so that the positioning server locates the terminal device based on the first measurement information and the second measurement information, thereby improving positioning accuracy.

Figure 3:
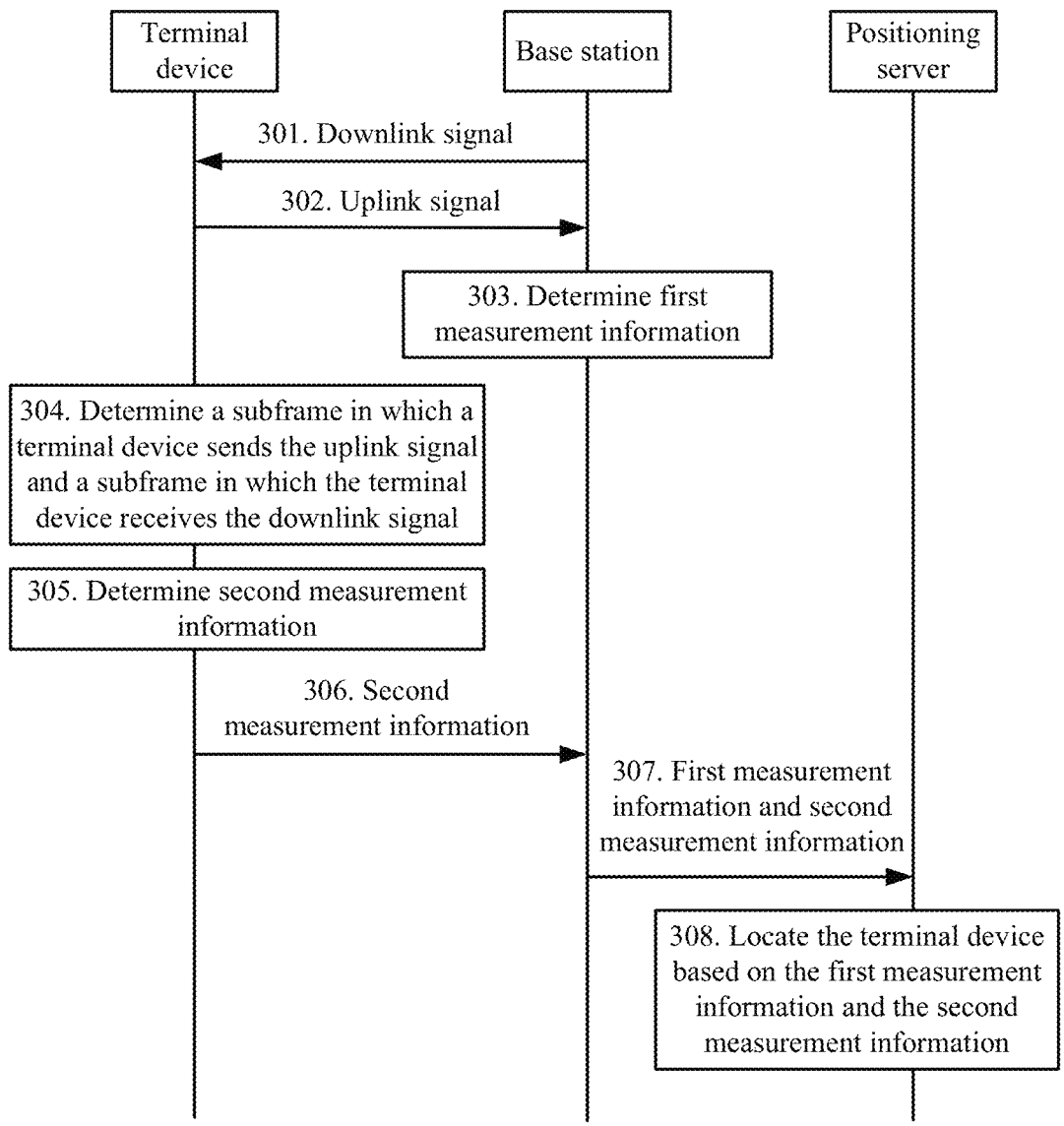
FIG. 3 is a schematic flowchart of a positioning information transmission method according to another embodiment of the present disclosure.

Based on the schematic architectural diagram of the positioning information transmission system shown in FIG. 1, FIG. 3 is a schematic flowchart of a positioning information transmission method according to another embodiment of the present disclosure. As shown in FIG. 3, the positioning information transmission method in this embodiment of the present disclosure may include the following steps.

S301. A base station sends a downlink signal to a terminal device.

For details, refer to the foregoing description about step S201. Details are not described again in this embodiment of the present disclosure.

S302. The terminal device generates an uplink signal, and sends the uplink signal to the base station.

For details, refer to the foregoing description about step S202. Details are not described again in this embodiment of the present disclosure.

S303. The base station determines first measurement information, where the first measurement information includes a difference between a receiving time of the uplink signal and a sending time of the downlink signal.

For details, refer to the foregoing description about step S203. Details are not described again in this embodiment of the present disclosure.

S304. The terminal device determines a subframe in which the terminal device sends the uplink signal and a subframe in which the terminal device receives the downlink signal.

After sending the uplink signal to the base station, the terminal device may determine the subframe in which the terminal device sends the uplink signal, for example, a number of the subframe in which the terminal device sends the uplink signal. In addition, after receiving the downlink signal sent by the base station, the terminal device may determine the subframe in which the terminal device receives the downlink signal, for example, a number of the subframe in which the terminal device receives the downlink signal.

S305. The terminal device determines second measurement information, where the second measurement information is used to indicate a difference between the subframe in which the terminal device sends the uplink signal and the subframe in which the terminal device receives the downlink signal.

After determining the subframe in which the terminal device sends the uplink signal and the subframe in which the terminal device receives the downlink signal, the terminal device may determine the second measurement information, where the second measurement information is used to indicate the difference between the subframe in which the terminal device sends the uplink signal and the subframe in which the terminal device receives the downlink signal. For example, the second measurement information may include the subframe number of the subframe in which the terminal device sends the uplink signal and the subframe number of the subframe in which the terminal device receives the downlink signal. For another example, the second measurement information may include the difference between the subframe in which the terminal device sends the uplink signal and the subframe in which the terminal device receives the downlink signal. For example, when the subframe number of the subframe in which the terminal device receives the downlink signal is 2, the subframe number of the subframe in which the terminal device sends the uplink signal is 4, and a subframe length of a first subframe is 0.125 ms, the terminal device may determine that the difference between the subframe in which the terminal device sends the uplink signal and the subframe in which the terminal device receives the downlink signal is (4−2)*0.125=0.25 ms. In other words, duration in which the terminal device processes the downlink signal is 0.25 ms.

S306. The terminal device sends the second measurement information to the base station.

Optionally, after determining the second measurement information, the terminal device may send the second measurement information to a positioning server by using a communications interface between the terminal device and the positioning server. In addition, after determining the first measurement information, the base station may send the first measurement information to the positioning server by using a communications interface between the base station and the positioning server, so that the positioning server locates the terminal device based on the first measurement information and the second measurement information.

S307. The base station sends the first measurement information and the second measurement information to a positioning server.

S308. The positioning server locates the terminal device based on the first measurement information and the second measurement information.

In the positioning information transmission method shown in FIG. 3, the base station determines the first measurement information, where the first measurement information includes the difference between the receiving time of the uplink signal and the sending time of the downlink signal; the terminal device determines the second measurement information, where the second measurement information is used to indicate the difference between the subframe in which the terminal device sends the uplink signal and the subframe in which the terminal device receives the downlink signal; the terminal device sends the second measurement information to the base station; and the base station sends the first measurement information and the second measurement information to the positioning server, for locating the terminal device by the positioning server.

Figure 4:
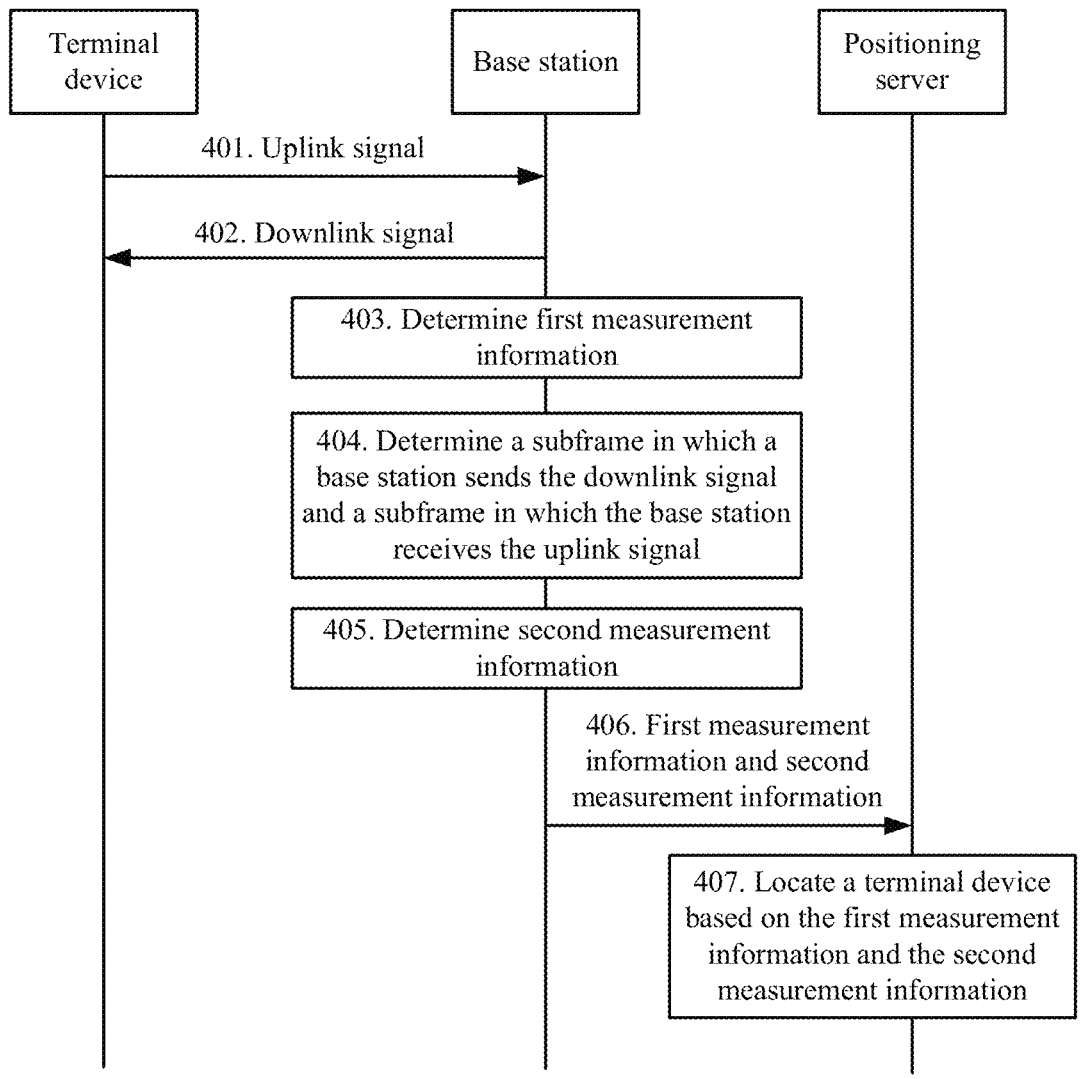
FIG. 4 is a schematic flowchart of a positioning information transmission method according to still another embodiment of the present disclosure.

Based on the schematic architectural diagram of the positioning information transmission system shown in FIG. 1, FIG. 4 is a schematic flowchart of a positioning information transmission method according to still another embodiment of the present disclosure. As shown in FIG. 4, the positioning information transmission method in this embodiment of the present disclosure may include the following steps.

S401. A terminal device sends an uplink signal to a base station.

In specific implementation, the terminal device may send an uplink signal to the base station at an interval of preset duration, and receive a downlink signal sent by the base station. After determining first measurement information and second measurement information, the base station may send the first measurement information and the second measurement information to a positioning server, for locating the terminal device by the positioning server.

Optionally, after receiving a request for locating the terminal device, the positioning server may configure the base station to measure an eNB Rx-Tx time difference. In this case, the base station may send a signal request to the terminal device, and the terminal device sends the uplink signal to the base station based on the signal request.

Optionally, the positioning server may inquire whether the base station has a capability of reporting the second measurement information. When the base station reports, to the positioning server, that the base station has the capability of reporting the second measurement information, the positioning server may send a second measurement information obtaining request to the base station, and the base station may send a signal obtaining request to the terminal device in response to the second measurement information obtaining request, so that the terminal device sends the uplink signal to the base station based on the signal request. Optionally, the base station may alternatively send, to the positioning server in response to the second measurement information obtaining request, second measurement information that is obtained most recently.

S402. The base station generates a downlink signal, and sends the downlink signal to the terminal device.

After receiving the uplink signal, the base station may process the uplink signal, generate a downlink signal, and send the downlink signal to the terminal device. A period from a time at which the base station receives the uplink signal to a time at which the base station sends the downlink signal may be duration in which the base station processes the uplink signal, where the processing duration may be obtained by using a difference between a subframe in which the base station sends the downlink signal and a subframe in which the base station receives the uplink signal. For example, when a subframe number of the subframe in which the base station receives the uplink signal is 2, a subframe number of the subframe in which the base station sends the downlink signal is 4, and a subframe length of a first subframe is 0.125 ms, the base station may determine that the duration in which the base station processes the uplink signal is (4−2)*0.125=0.25 ms.

S403. The base station determines first measurement information, where the first measurement information includes a difference between a sending time of the downlink signal and a receiving time of the uplink signal.

The base station may determine the first measurement information, where the first measurement information may include the difference between the sending time of the downlink signal and the receiving time of the uplink signal. For example, if the sending time at which the base station sends the downlink signal is 10:30, and the receiving time at which the base station receives the uplink signal is 10:10, the base station may determine that the first measurement information is 20 min.

S404. The base station determines a subframe in which the base station sends the downlink signal and a subframe in which the base station receives the uplink signal.

After receiving the uplink signal sent by the terminal device, the base station may determine the subframe in which the base station receives the uplink signal, for example, the subframe number of the subframe in which the base station receives the uplink signal. In addition, after sending the downlink signal to the terminal device, the base station may determine the subframe in which the base station sends the downlink signal, for example, the subframe number of the subframe in which the base station sends the downlink signal.

S405. The base station determines second measurement information, where the second measurement information is used to indicate a difference between the subframe in which the base station sends the downlink signal and the subframe in which the base station receives the uplink signal.

After determining the subframe in which the base station receives the uplink signal and the subframe in which the base station sends the downlink signal, the base station may determine the second measurement information, where the second measurement information is used to indicate the difference between the subframe in which the base station sends the downlink signal and the subframe in which the base station receives the uplink signal. For example, the second measurement information may include the subframe number of the subframe in which the base station receives the uplink signal and the subframe number of the subframe in which the base station sends the downlink signal. For another example, the second measurement information may include the difference between the subframe in which the base station sends the downlink signal and the subframe in which the base station receives the uplink signal. For example, when the subframe number of the subframe in which the base station receives the uplink signal is 2, the subframe number of the subframe in which the base station sends the downlink signal is 4, and a subframe length of a first subframe is 0.125 ms, the base station may determine that the difference between the subframe in which the base station sends the downlink signal and the subframe in which the base station receives the uplink signal is (4−2) *0.125=0.25 ms. In other words, the duration in which the base station processes the uplink signal is 0.25 ms.

S406. The base station sends the first measurement information and the second measurement information to a positioning server.

After determining the first measurement information and the second measurement information, the base station may send the first measurement information and the second measurement information to the positioning server by using a communications interface between the base station and the positioning server.

S407. The positioning server locates the terminal device based on the first measurement information and the second measurement information.

After receiving the first measurement information and the second measurement information by using the communications interface between the base station and the positioning server, the positioning server may obtain a distance between the terminal device and the base station by using the following formula: (eNB Rx-Tx time difference−(Subframe in which the base station sends the downlink signal−Subframe in which the base station receives the uplink signal))/(2*Light velocity); and locate the terminal device based on the distance between the terminal device and the base station.

In the positioning information transmission method shown in FIG. 4, the base station determines the first measurement information, where the first measurement information includes the difference between the sending time of the downlink signal and the receiving time of the uplink signal; determines the second measurement information, where the second measurement information is used to indicate the difference between the subframe in which the base station sends the downlink signal and the subframe in which the base station receives the uplink signal; and sends the first measurement information and the second measurement information to the positioning server, for locating the terminal device by the positioning server, thereby improving positioning accuracy.

Figure 5:
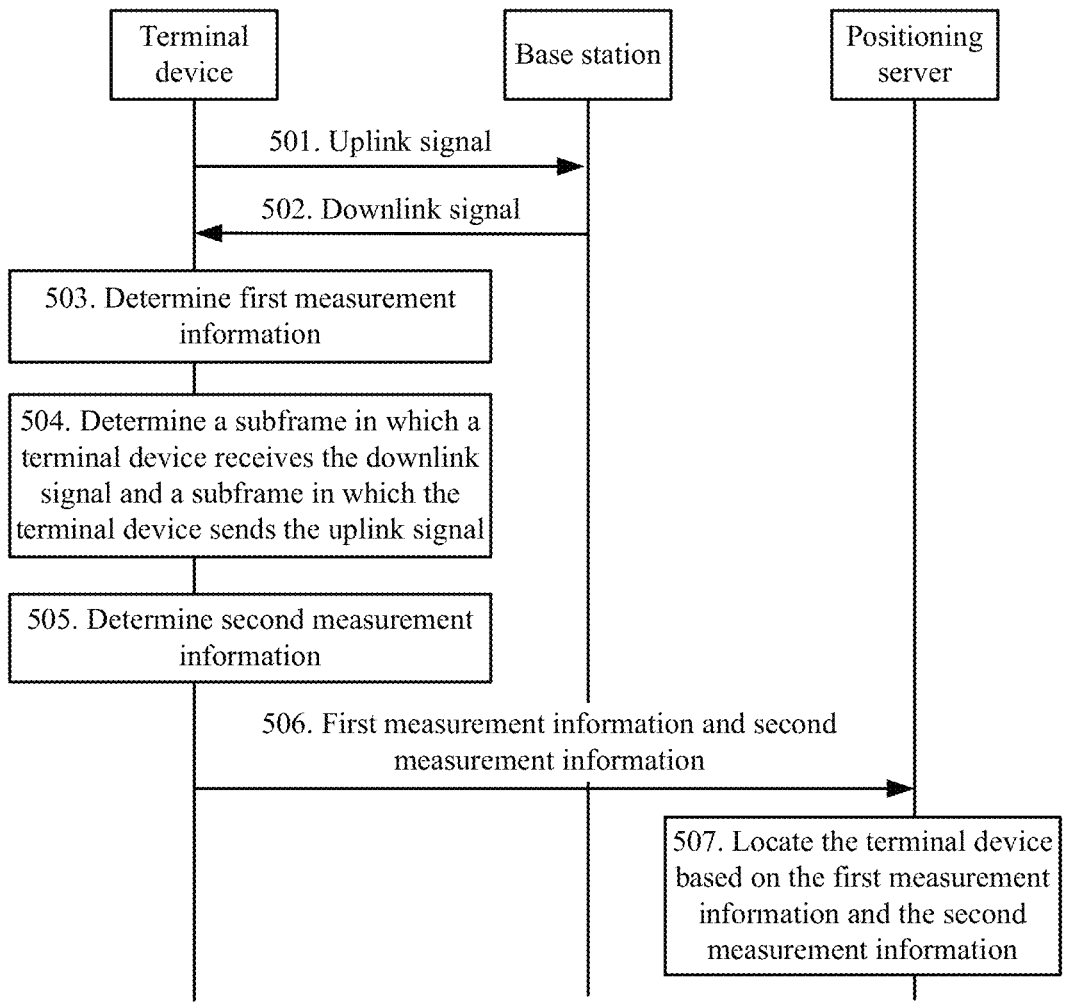
FIG. 5 is a schematic flowchart of a positioning information transmission method according to yet another embodiment of the present disclosure.

Based on the schematic architectural diagram of the positioning information transmission system shown in FIG. 1, FIG. 5 is a schematic flowchart of a positioning information transmission method according to yet another embodiment of the present disclosure. As shown in FIG. 5, the positioning information transmission method in this embodiment of the present disclosure may include the following steps.

S501. A terminal device sends an uplink signal to a base station.

In specific implementation, the terminal device may send an uplink signal to the base station at an interval of preset duration, and receive a downlink signal sent by the base station. After determining first measurement information and second measurement information, the terminal device may send the first measurement information and the second measurement information to a positioning server, for locating the terminal device by the positioning server.

Optionally, after receiving a request for locating the terminal device, the positioning server may configure the terminal device to measure a UE Rx-Tx time difference. In this case, the terminal device may send the uplink signal to the base station.

Optionally, the positioning server may inquire whether the terminal device has a capability of reporting the second measurement information. When the terminal device reports, to the positioning server, that the terminal device has the capability of reporting the second measurement information, the positioning server may send a second measurement information obtaining request to the terminal device. The terminal device may send the uplink signal to the base station in response to the second measurement information obtaining request. Optionally, the terminal device may alternatively send, to the positioning server in response to the second measurement information obtaining request, second measurement information that is obtained most recently.

S502. The base station generates a downlink signal, and sends the downlink signal to the terminal device.

For details, refer to the foregoing description about step S402. Details are not described again in this embodiment of the present disclosure.

S503. The terminal device determines first measurement information, where the first measurement information includes a difference between a receiving time of the downlink signal and a sending time of the uplink signal.

When sending the uplink signal to the base station, the terminal device may determine the sending time of the uplink signal; and when receiving the downlink signal sent by the base station, the terminal device may determine the receiving time of the downlink signal, so as to obtain the first measurement information by using the difference between the receiving time of the downlink signal and the sending time of the uplink signal.

S504. The terminal device determines a subframe in which the terminal device receives the downlink signal and a subframe in which the terminal device sends the uplink signal.

After sending the uplink signal to the base station, the terminal device may determine the subframe in which the terminal device sends the uplink signal, for example, a number of the subframe in which the terminal device sends the uplink signal. In addition, after receiving the downlink signal sent by the base station, the terminal device may determine the subframe in which the terminal device receives the downlink signal, for example, a number of the subframe in which the terminal device receives the downlink signal.

S505. The terminal device determines second measurement information, where the second measurement information is used to indicate a difference between the subframe in which the terminal device receives the downlink signal and the subframe in which the terminal device sends the uplink signal.

After determining the subframe in which the terminal device sends the uplink signal and the subframe in which the terminal device receives the downlink signal, the terminal device may determine the second measurement information, where the second measurement information is used to indicate the difference between the subframe in which the terminal device receives the downlink signal and the subframe in which the terminal device sends the uplink signal. For example, the second measurement information may include the subframe number of the subframe in which the terminal device sends the uplink signal and the subframe number of the subframe in which the terminal device receives the downlink signal. For another example, the second measurement information may include the difference between the subframe in which the terminal device receives the downlink signal and the subframe in which the terminal device sends the uplink signal. For example, when the subframe number of the subframe in which the terminal device sends the uplink signal is 2, the subframe number of the subframe in which the terminal device receives the downlink signal is 4, and when a subframe length of a first subframe is 0.125 ms, the terminal device may determine that the difference between the subframe in which the terminal device receives the downlink signal and the subframe in which the terminal device sends the uplink signal is (4−2)*0.125=0.25 ms. In other words, duration in which the base station processes the uplink signal is 0.25 ms.

S506. The terminal device sends the first measurement information and the second measurement information to a positioning server.

After determining the first measurement information and the second measurement information, the terminal device may send the first measurement information and the second measurement information to the positioning server by using a communications interface between the terminal device and the positioning server.

S507. The positioning server locates the terminal device based on the first measurement information and the second measurement information.

After receiving the first measurement information and the second measurement information by using the communications interface between the terminal device and the positioning server, the positioning server may obtain a distance between the terminal device and the base station by using the following formula: (UE Rx-Tx time difference−(Subframe in which the terminal device receives the downlink signal−Subframe in which the terminal device sends the uplink signal))/(2*Light velocity); and locate the terminal device based on the distance between the terminal device and the base station.

In the positioning information transmission method shown in FIG. 5, the terminal device determines the first measurement information, where the first measurement information includes the difference between the sending time of the downlink signal and the receiving time of the uplink signal; determines the second measurement information, where the second measurement information is used to indicate the difference between the subframe in which the base station sends the downlink signal and the subframe in which the base station receives the uplink signal; and sends the first measurement information and the second measurement information to the positioning server, for locating the terminal device by the positioning server, thereby improving positioning accuracy.

Figure 6:
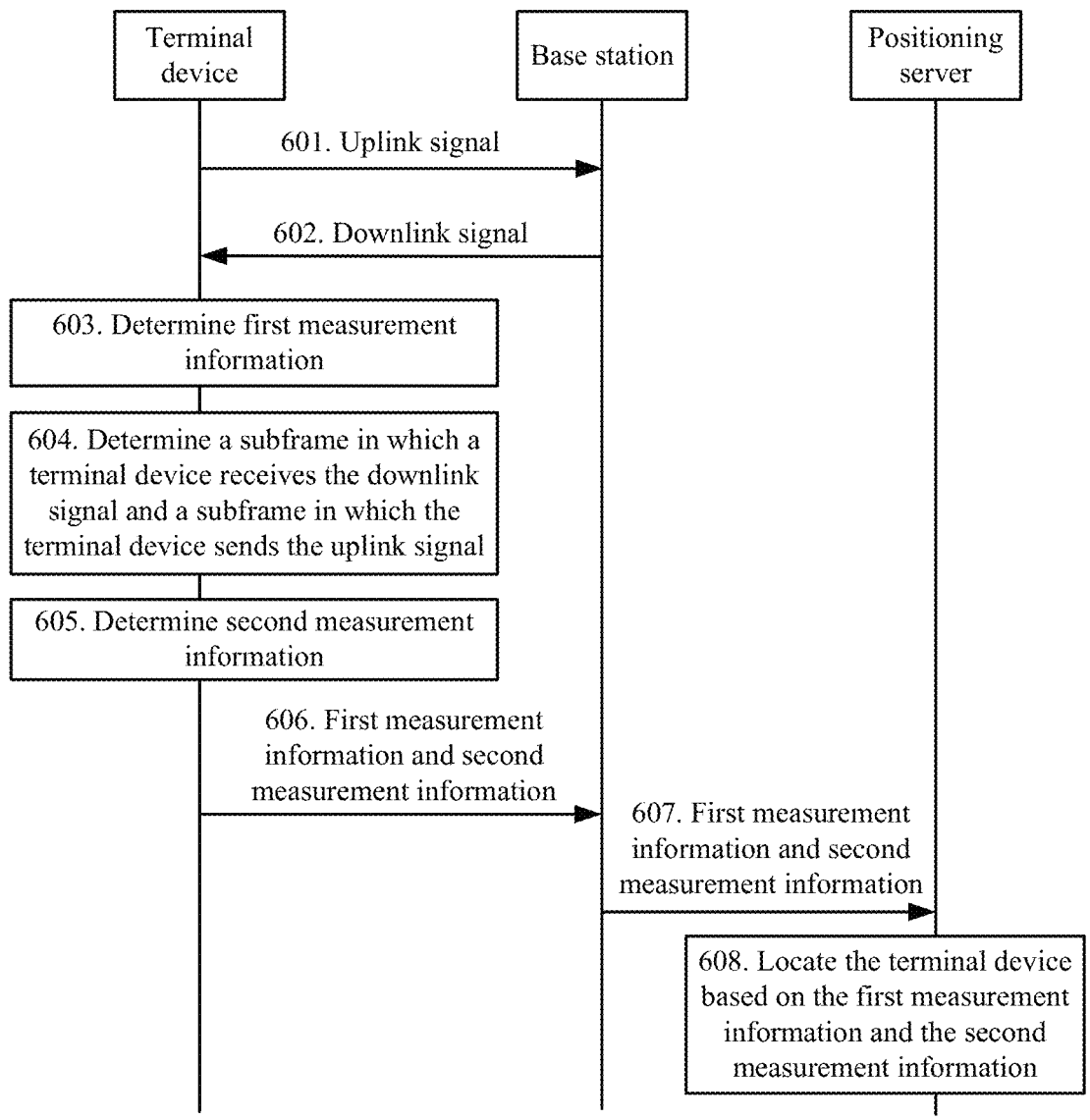
FIG. 6 is a schematic flowchart of a positioning information transmission method according to still yet another embodiment of the present disclosure.

Based on the schematic architectural diagram of the positioning information transmission system shown in FIG. 1, FIG. 6 is a schematic flowchart of a positioning information transmission method according to still yet another embodiment of the present disclosure. As shown in FIG. 6, the positioning information transmission method in this embodiment of the present disclosure may include the following steps.

S601. A terminal device sends an uplink signal to a base station.

For details, refer to the foregoing description about step S401. Details are not described again in this embodiment of the present disclosure.

S602. The base station generates a downlink signal, and sends the downlink signal to the terminal device.

For details, refer to the foregoing description about step S402. Details are not described again in this embodiment of the present disclosure.

S603. The terminal device determines first measurement information, where the first measurement information includes a difference between a receiving time of the downlink signal and a sending time of the uplink signal.

For details, refer to the foregoing description about step S503. Details are not described again in this embodiment of the present disclosure.

S604. The terminal device determines a subframe in which the terminal device receives the downlink signal and a subframe in which the terminal device sends the uplink signal.

For details, refer to the foregoing description about step S504. Details are not described again in this embodiment of the present disclosure.

S605. The terminal device determines second measurement information, where the second measurement information is used to indicate a difference between the subframe in which the terminal device receives the downlink signal and the subframe in which the terminal device sends the uplink signal.

For details, refer to the foregoing description about step S505. Details are not described again in this embodiment of the present disclosure.

S606. The terminal device sends the first measurement information and the second measurement information to the base station.

S607. The base station sends the first measurement information and the second measurement information to a positioning server.

S608. The positioning server locates the terminal device based on the first measurement information and the second measurement information.

Optionally, after the base station generates the downlink signal and sends the downlink signal to the terminal device, the base station may determine the first measurement information, and the base station sends the first measurement information to the positioning server; and the terminal device may determine the second measurement information, and the terminal device sends the second measurement information to the positioning server, so that the positioning server locates the terminal device based on the first measurement information and the second measurement information.

Optionally, after the base station generates the downlink signal and sends the downlink signal to the terminal device, the base station may determine the first measurement information, and the terminal device may determine the second measurement information; and the terminal device sends the second measurement information to the base station, and the base station sends the first measurement information and the second measurement information to the positioning server, so that the positioning server locates the terminal device based on the first measurement information and the second measurement information.

Optionally, after the base station generates the downlink signal and sends the downlink signal to the terminal device, the terminal device may determine the first measurement information, and the terminal device sends the first measurement information to the positioning server; and the base station may determine the second measurement information, and the base station sends the second measurement information to the positioning server, so that the positioning server locates the terminal device based on the first measurement information and the second measurement information.

Optionally, after the base station generates the downlink signal and sends the downlink signal to the terminal device, the terminal device may determine the first measurement information, and the terminal device sends the first measurement information to the base station; and the base station may determine the second measurement information, and the base station sends the first measurement information and the second measurement information to the positioning server, so that the positioning server locates the terminal device based on the first measurement information and the second measurement information.

In the positioning information transmission method shown in FIG. 6, the terminal device determines the first measurement information and the second measurement information, and then may send the first measurement information and the second measurement information to the base station, and the base station sends the first measurement information and the second measurement information to the positioning server, for locating the terminal device by the positioning server, thereby improving positioning accuracy.

Based on the schematic architectural diagram of the positioning information transmission system shown in FIG.

Figure 7:
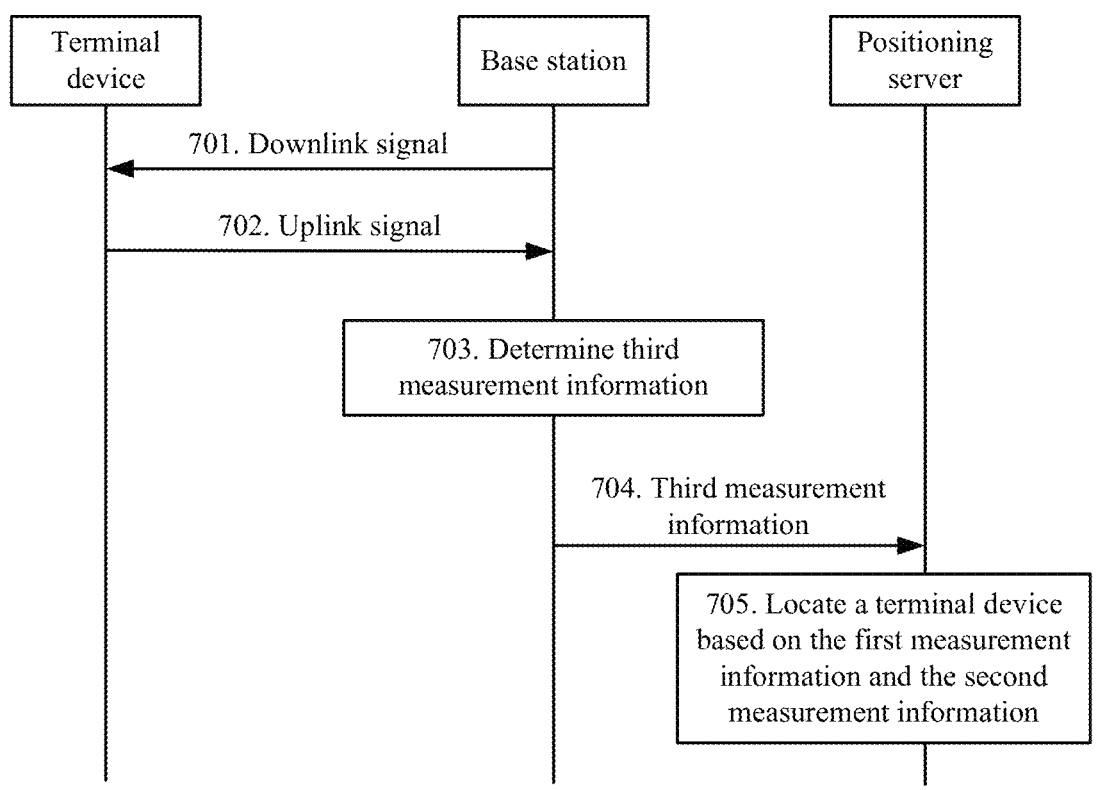
FIG. 7 is a schematic flowchart of a positioning information transmission method according to a further embodiment of the present disclosure.

1, FIG. 7 is a schematic flowchart of a positioning information transmission method according to a further embodiment of the present disclosure. As shown in FIG. 7, the positioning information transmission method in this embodiment of the present disclosure may include the following steps.

S701. A base station sends a downlink signal to a terminal device.

For details, refer to the foregoing description about step S201. Details are not described again in this embodiment of the present disclosure.

S702. The terminal device generates an uplink signal, and sends the uplink signal to the base station.

For details, refer to the foregoing description about step S202. Details are not described again in this embodiment of the present disclosure.

S703. The base station determines third measurement information, where the third measurement information is used to indicate a distance between the base station and the terminal device, or the third measurement information is used to indicate a transmission time of the uplink signal and/or a transmission time of the downlink signal.

In specific implementation, the base station may determine first measurement information, where the first measurement information includes a difference between a receiving time of the uplink signal and a sending time of the downlink signal; and determine second measurement information, where the second measurement information is used to indicate a difference between a subframe in which the base station receives the uplink signal and a subframe in which the base station sends the downlink signal; and the base station may calculate the third measurement information based on the first measurement information and the second measurement information. For example, the base station subtracts the second measurement information from the first measurement information, and obtained third measurement information is used to indicate a sum of the transmission time of the uplink signal and the transmission time of the downlink signal. For another example, the base station uses, as the third measurement information, half of a difference that is obtained after the second measurement information is subtracted from the first measurement information, where the third measurement information is used to indicate the transmission time of the uplink signal or the transmission time of the downlink signal. For another example, the base station uses, as the third measurement information, a quotient that is obtained after half of the difference between the first measurement information and the second measurement information is divided by light velocity, where the third measurement information is used to indicate a one-way distance between the base station and the terminal device. For another example, the base station uses, as the third measurement information, a quotient that is obtained after the difference between the first measurement information and the second measurement information is divided by light velocity, where the third measurement information is used to indicate a round-trip distance between the base station and the terminal device.

Optionally, the terminal device may determine the second measurement information, and send the second measurement information to the base station; and the base station calculates the third measurement information based on the determined first measurement information and the second measurement information that is sent by the terminal device.

S704. The base station sends the third measurement information to a positioning server.

The base station may send the third measurement information to the positioning server by using a communications interface between the base station and the positioning server.

S705. The positioning server locates the terminal device based on the third measurement information.

In the positioning information transmission method shown in FIG. 7, the base station sends the third measurement information to the positioning server, where the third measurement information is used to indicate the distance between the base station and the terminal device, or the third measurement information is used to indicate the transmission time of the uplink signal and/or the transmission time of the downlink signal, for locating the terminal device by the positioning server, thereby improving positioning accuracy.

Figure 8:
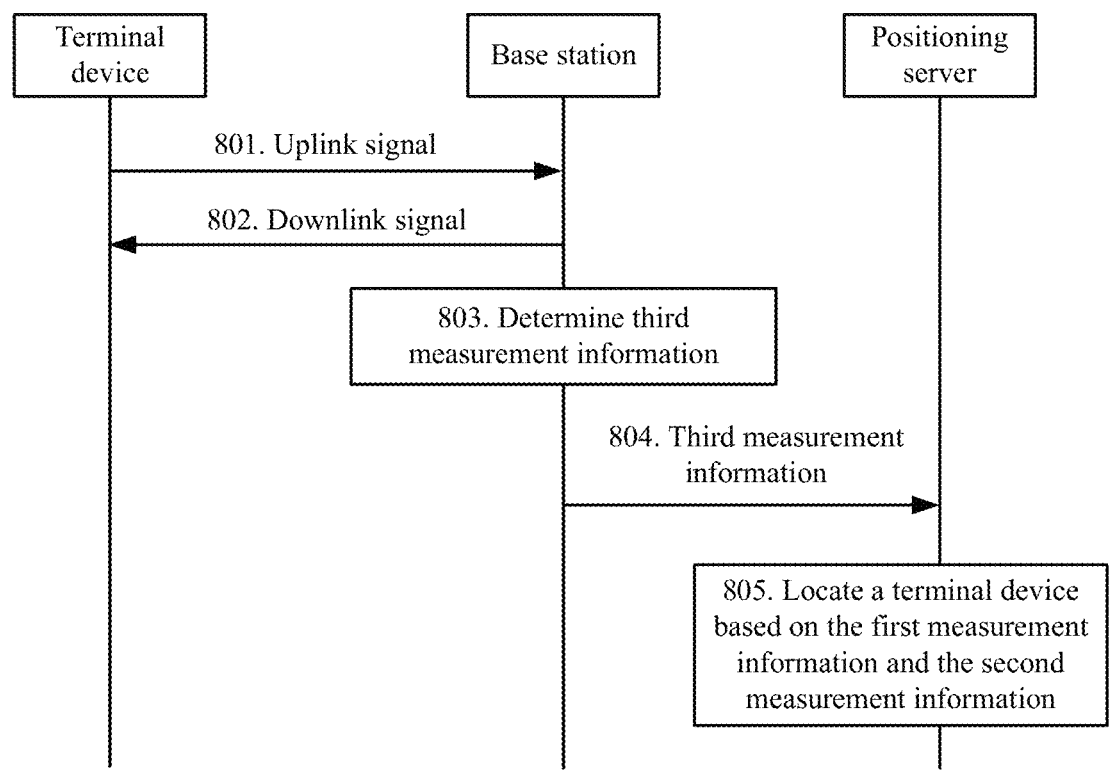
FIG. 8 is a schematic flowchart of a positioning information transmission method according to a still further embodiment of the present disclosure.

Based on the schematic architectural diagram of the positioning information transmission system shown in FIG. 1, FIG. 8 is a schematic flowchart of a positioning information transmission method according to a still further embodiment of the present disclosure. As shown in FIG. 8, the positioning information transmission method in this embodiment of the present disclosure may include the following steps.

S801. A terminal device sends an uplink signal to a base station.

For details, refer to the foregoing description about step S401. Details are not described again in this embodiment of the present disclosure.

S802. The base station generates a downlink signal, and sends the downlink signal to the terminal device.

For details, refer to the foregoing description about step S402. Details are not described again in this embodiment of the present disclosure.

S803. The base station determines third measurement information, where the third measurement information is used to indicate a distance between the base station and the terminal device, or the third measurement information is used to indicate a transmission time of the uplink signal and/or a transmission time of the downlink signal.

In specific implementation, the base station may determine first measurement information, where the first measurement information includes a difference between a sending time of the downlink signal and a receiving time of the uplink signal; and determine second measurement information, where the second measurement information is used to indicate a difference between a subframe in which the base station sends the downlink signal and a subframe in which the base station receives the uplink signal; and the base station may calculate the third measurement information based on the first measurement information and the second measurement information. For example, the base station subtracts the second measurement information from the first measurement information, and obtained third measurement information is used to indicate a sum of the transmission time of the uplink signal and the transmission time of the downlink signal. For another example, the base station uses, as the third measurement information, half of a difference that is obtained after the second measurement information is subtracted from the first measurement information, where the third measurement information is used to indicate the transmission time of the uplink signal or the transmission time of the downlink signal. For another example, the base station uses, as the third measurement information, a quotient that is obtained after half of the difference between the first measurement information and the second measurement information is divided by light velocity, where the third measurement information is used to indicate a one-way distance between the base station and the terminal device. For another example, the base station uses, as the third measurement information, a quotient that is obtained after the difference between the first measurement information and the second measurement information is divided by light velocity, where the third measurement information is used to indicate a round-trip distance between the base station and the terminal device.

Optionally, the terminal device may determine the second measurement information, and send the second measurement information to the base station; and the base station calculates the third measurement information based on the determined first measurement information and the second measurement information that is sent by the terminal device.

Optionally, the terminal device may determine the first measurement information, and send the first measurement information to the base station; and the base station calculates the third measurement information based on the first measurement information sent by the terminal device and the determined second measurement information.

Optionally, the terminal device may determine the first measurement information and the second measurement information, and send the first measurement information and the second measurement information to the base station; and the base station calculates the third measurement information based on the first measurement information and the second measurement information that are sent by the terminal device.

S804. The base station sends the third measurement information to a positioning server.

S805. The positioning server locates the terminal device based on the third measurement information.

In the positioning information transmission method shown in FIG. 8, the base station sends the third measurement information to the positioning server, where the third measurement information is used to indicate the distance between the base station and the terminal device, or the third measurement information is used to indicate the transmission time of the uplink signal and/or the transmission time of the downlink signal, for locating the terminal device by the positioning server, thereby improving positioning accuracy.

Figure 9:
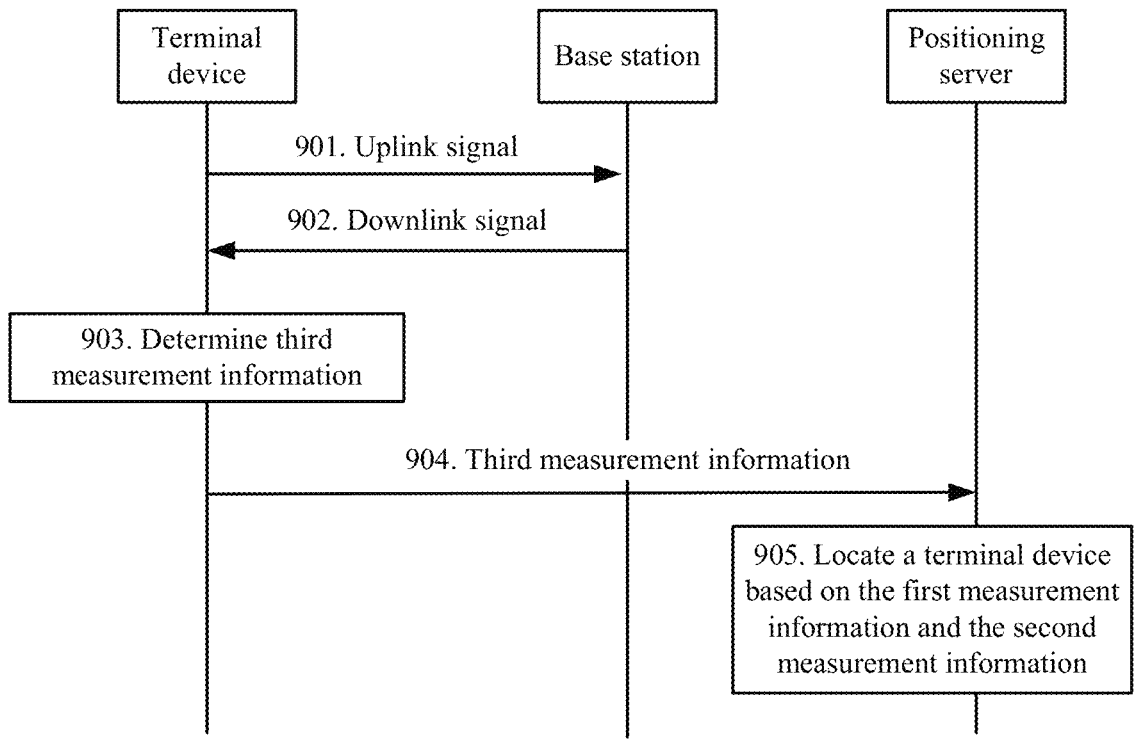
FIG. 9 is a schematic flowchart of a positioning information transmission method according to a yet further embodiment of the present disclosure.

Based on the schematic architectural diagram of the positioning information transmission system shown in FIG. 1, FIG. 9 is a schematic flowchart of a positioning information transmission method according to a yet further embodiment of the present disclosure. As shown in FIG. 9, the positioning information transmission method in this embodiment of the present disclosure may include the following steps.

S901. A terminal device sends an uplink signal to a base station.

For details, refer to the foregoing description about step S501. Details are not described again in this embodiment of the present disclosure.

S902. The base station generates a downlink signal, and sends the downlink signal to the terminal device.

For details, refer to the foregoing description about step S402. Details are not described again in this embodiment of the present disclosure.

S903. The terminal device determines third measurement information, where the third measurement information is used to indicate a distance between the base station and the terminal device, or the third measurement information is used to indicate a transmission time of the uplink signal and/or a transmission time of the downlink signal.

In specific implementation, the terminal device may determine first measurement information, where the first measurement information includes a difference between a receiving time of the downlink signal and a sending time of the uplink signal; and determine second measurement information, where the second measurement information is used to indicate a difference between a subframe in which the terminal device receives the downlink signal and a subframe in which the terminal device sends the uplink signal; and the terminal device may calculate the third measurement information based on the first measurement information and the second measurement information. For example, the terminal device subtracts the second measurement information from the first measurement information, and obtained third measurement information is used to indicate a sum of the transmission time of the uplink signal and the transmission time of the downlink signal. For another example, the terminal device uses, as the third measurement information, half of a difference that is obtained after the second measurement information is subtracted from the first measurement information, where the third measurement information is used to indicate the transmission time of the uplink signal or the transmission time of the downlink signal. For another example, the terminal device uses, as the third measurement information, a quotient that is obtained after half of the difference between the first measurement information and the second measurement information is divided by light velocity, where the third measurement information is used to indicate a one-way distance between the base station and the terminal device. For another example, the terminal device uses, as the third measurement information, a quotient that is obtained after the difference between the first measurement information and the second measurement information is divided by light velocity, where the third measurement information is used to indicate a round-trip distance between the base station and the terminal device.

S904. The terminal device sends the third measurement information to a positioning server.

S905. The positioning server locates the terminal device based on the third measurement information.

In the positioning information transmission method shown in FIG. 9, the terminal device sends the third measurement information to the positioning server, where the third measurement information is used to indicate the distance between the base station and the terminal device, or the third measurement information is used to indicate the transmission time of the uplink signal and/or the transmission time of the downlink signal, for locating the terminal device by the positioning server, thereby improving positioning accuracy.

Figure 10:
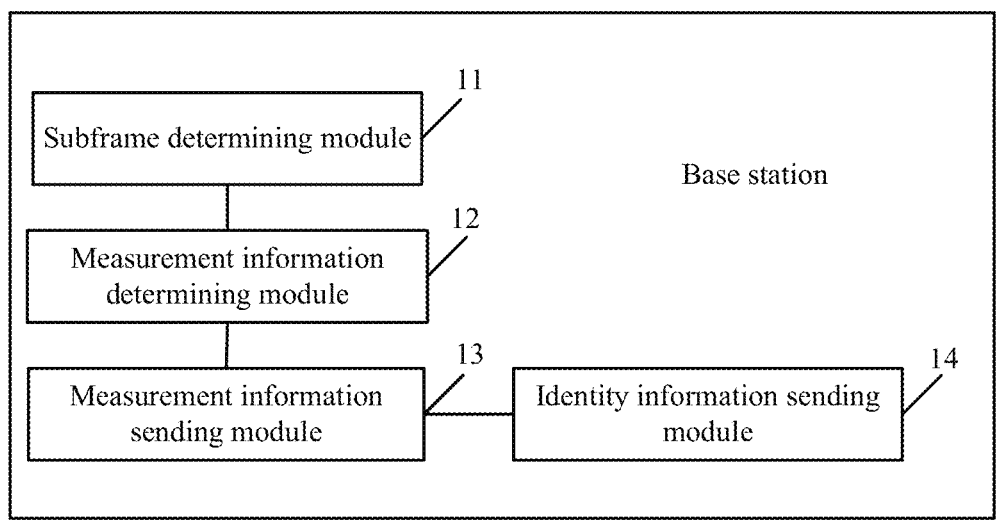
FIG. 10 is a schematic structural diagram of a base station according to an embodiment of the present disclosure.

FIG. 10 is a schematic structural diagram of a base station according to an embodiment of the present disclosure. As shown in FIG. 10, the base station in this embodiment of the present disclosure may include a subframe determining module 11, a measurement information determining module 12, and a measurement information sending module 13.

The subframe determining module 11 is configured to determine an uplink subframe for carrying an uplink signal.

The subframe determining module 11 is further configured to determine a downlink subframe for carrying a downlink signal.

The measurement information determining module 12 is configured to determine first measurement information, where the first measurement information includes a difference between a receiving time of the uplink signal and a sending time of the downlink signal, or the first measurement information includes a difference between a receiving time of the downlink signal and a sending time of the uplink signal.

The measurement information determining module 12 is further configured to determine second measurement information, where the second measurement information is used to indicate a difference between the uplink subframe and the downlink subframe.

The measurement information sending module 13 is configured to send the first measurement information and the second measurement information to a positioning server, for locating a terminal device by the positioning server.

Optionally, the difference between the uplink subframe and the downlink subframe is obtained by using a difference between a subframe identifier of the uplink subframe and a subframe identifier of the downlink subframe.

Optionally, the second measurement information includes at least one of the following:

the uplink subframe and the downlink subframe;

a quantity of times of repeatedly carrying the uplink subframe;

a quantity of times of repeatedly carrying the downlink subframe;

the difference between the uplink subframe and the downlink subframe; and a configuration (UL/DL configuration) between the uplink subframe and the downlink subframe.

Further, in an optional embodiment, the base station may further include:

an identity information sending module 14, configured to: before the measurement information sending module 13 sends the second measurement information to the positioning server, send identity information to the positioning server, where the identity information is used to indicate that the base station has a capability of sending the second measurement information.

The measurement information sending module 13 is further configured to: when a measurement information obtaining request that is fed back by the positioning server in response to the identity information is received, send the second measurement information to the positioning server.

In this embodiment of the present disclosure, the subframe determining module 11 determines the uplink subframe for carrying the uplink signal and the downlink subframe for carrying the downlink signal; the measurement information determining module 12 determines the first measurement information and the second measurement information; and the measurement information sending module 13 sends the first measurement information and the second measurement information to the positioning server, for locating the terminal device by the positioning server, thereby improving positioning accuracy.

Figure 11:
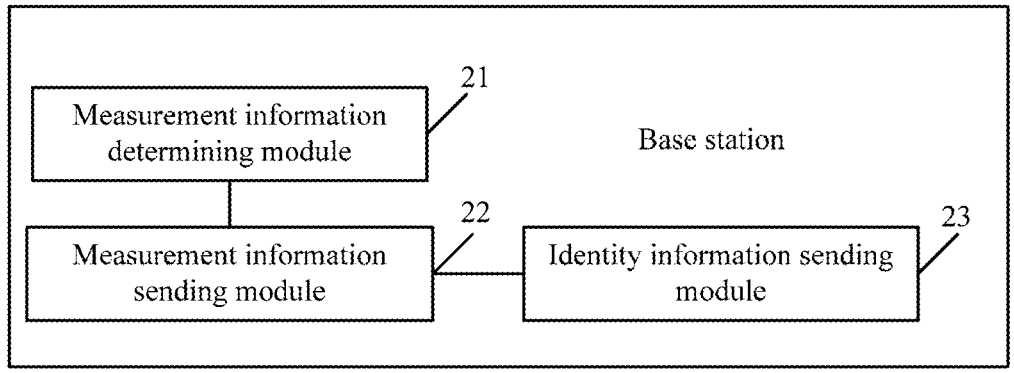
FIG. 11 is a schematic structural diagram of a base station according to another embodiment of the present disclosure.

FIG. 11 is a schematic structural diagram of a base station according to another embodiment of the present disclosure. As shown in FIG. 11, the base station in this embodiment of the present disclosure may include: a measurement information determining module 21 and a measurement information sending module 22.

The measurement information determining module 21 is configured to determine third measurement information, where the third measurement information is used to indicate a distance between the base station and a terminal device, or the third measurement information is used to indicate a transmission time of an uplink signal and/or a transmission time of a downlink signal.

The measurement information sending module 22 is configured to send the third measurement information to a positioning server, for locating the terminal device by the positioning server.

Further, in an optional embodiment, the measurement information determining module 21 is specifically configured to receive the third measurement information sent by the terminal device.

Further, in an optional embodiment, the measurement information determining module 21 may be specifically configured to:

determine first measurement information, where the first measurement information includes a difference between a receiving time of the uplink signal and a sending time of the downlink signal, or the first measurement information includes a difference between a receiving time of the downlink signal and a sending time of the uplink signal;

receive second measurement information sent by the terminal device, where the second measurement information is used to indicate a difference between an uplink subframe for carrying the uplink signal and a downlink subframe for carrying the downlink signal; and calculate the third measurement information based on the first measurement information and the second measurement information.

Optionally, the difference between the uplink subframe and the downlink subframe is obtained by using a difference between a subframe identifier of the uplink subframe and a subframe identifier of the downlink subframe.

Optionally, the second measurement information includes at least one of the following:

the uplink subframe and the downlink subframe;

a quantity of times of repeatedly carrying the uplink subframe;

a quantity of times of repeatedly carrying the downlink subframe;

the difference between the uplink subframe and the downlink subframe; and a configuration (UL/DL configuration) between the uplink subframe and the downlink subframe.

Further, in an optional embodiment, the base station may further include:

an identity information sending module 23, configured to: before the measurement information sending module 22 sends the third measurement information to the positioning server, send identity information to the positioning server, where the identity information is used to indicate that the base station has a capability of sending the third measurement information; and the measurement information sending module 22 is further configured to: when a measurement information obtaining request that is fed back by the positioning server in response to the identity information is received, send the third measurement information to the positioning server.

Optionally, the third measurement information includes a sum of the transmission time of the uplink signal and the transmission time of the downlink signal, the transmission time of the uplink signal, the transmission time of the downlink signal, and a round-trip distance between the base station and the terminal device or a one-way distance between the base station and the terminal device.

In this embodiment of the present disclosure, the measurement information determining module 21 determines the third measurement information, and the measurement information sending module 22 sends the third measurement information to the positioning server, for locating a terminal device by the positioning server, thereby improving positioning accuracy.

Figure 12:
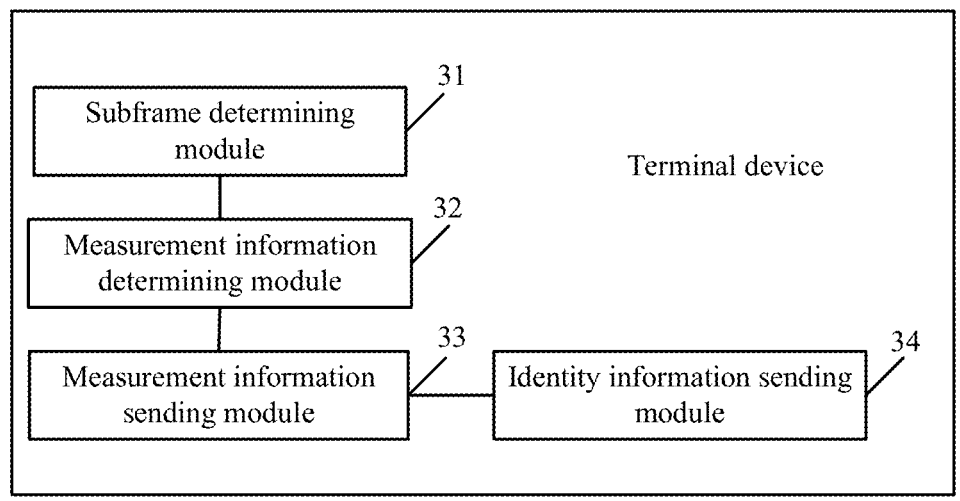
FIG. 12 is a schematic structural diagram of a terminal device according to an embodiment of the present disclosure.

FIG. 12 is a schematic structural diagram of a terminal device according to an embodiment of the present disclosure. As shown in FIG. 12, the terminal device in this embodiment of the present disclosure may include a measurement information determining module 32 and a measurement information sending module 33.

The measurement information determining module 32 is configured to determine first measurement information, where the first measurement information includes a difference between a receiving time of a downlink signal and a sending time of an uplink signal.

The measurement information sending module 33 is configured to send the first measurement information to a positioning server, for locating the terminal device by the positioning server.

Further, in an optional embodiment, the terminal device may further include:

a subframe determining module 31, configured to determine an uplink subframe for carrying the uplink signal;

the subframe determining module 31 is further configured to determine a downlink subframe for carrying the downlink signal;

the measurement information determining module 32 is further configured to determine second measurement information, where the second measurement information is used to indicate a difference between the uplink subframe and the downlink subframe;

the measurement information determining module 32 is further configured to calculate third measurement information based on the first measurement information and the second measurement information, where the third measurement information is used to indicate a distance between a base station and the terminal device, or the third measurement information is used to indicate a transmission time of the uplink signal and/or a transmission time of the downlink signal; and the measurement information sending module 33 is further configured to send the third measurement information to the positioning server, for locating the terminal device by the positioning server.

Further, in an optional embodiment, the terminal device may further include:

a subframe determining module 31, configured to determine an uplink subframe for carrying the uplink signal;

the subframe determining module 31 is further configured to determine a downlink subframe for carrying the downlink signal;

the measurement information determining module 32 is further configured to determine second measurement information, where the second measurement information is used to indicate a difference between the uplink subframe and the downlink subframe; and the measurement information sending module 33 is further configured to send the second measurement information to the positioning server.

Further, in an optional embodiment, the terminal device may further include:

a subframe determining module 31, configured to determine an uplink subframe for carrying the uplink signal;

the subframe determining module 31 is further configured to determine a downlink subframe for carrying the downlink signal;

the measurement information determining module 32 is further configured to determine second measurement information, where the second measurement information is used to indicate a difference between the uplink subframe and the downlink subframe; and the measurement information sending module 33 is further configured to send the second measurement information to a base station.

Optionally, the difference between the uplink subframe and the downlink subframe is obtained by using a difference between a subframe identifier of the uplink subframe and a subframe identifier of the downlink subframe.

Further, optionally, the second measurement information includes at least one of the following:

the uplink subframe and the downlink subframe;

a quantity of times of repeatedly carrying the uplink subframe;

a quantity of times of repeatedly carrying the downlink subframe;

the difference between the uplink subframe and the downlink subframe; and a configuration (UL/DL configuration) between the uplink subframe and the downlink subframe.

Further, in an optional embodiment, the terminal device may further include:

an identity information sending module 34, configured to: before the measurement information sending module 33 sends the second measurement information to the positioning server, send identity information to the positioning server, where the identity information is used to indicate that the terminal device has a capability of sending the second measurement information; and the measurement information sending module 33 is further configured to: when a measurement information obtaining request that is fed back by the positioning server in response to the identity information is received, send the second measurement information to the positioning server.

Further, in an optional embodiment, the terminal device may further include:

an identity information sending module 34, configured to: before the measurement information sending module 33 sends the third measurement information to the positioning server, send identity information to the positioning server, where the identity information is used to indicate that the terminal device has a capability of sending the third measurement information; and the measurement information sending module 33 is further configured to: when a measurement information obtaining request that is fed back by the positioning server in response to the identity information is received, send the third measurement information to the positioning server.

Optionally, the third measurement information includes a sum of the transmission time of the uplink signal and the transmission time of the downlink signal, the transmission time of the uplink signal, the transmission time of the downlink signal, and a round-trip distance between the base station and the terminal device or a one-way distance between the base station and the terminal device.

In this embodiment of the present disclosure, the measurement information determining module 32 determines the first measurement information, and the measurement information sending module 33 sends the first measurement information to the positioning server, for locating the terminal device by the positioning server, thereby improving positioning accuracy.

Figure 13:
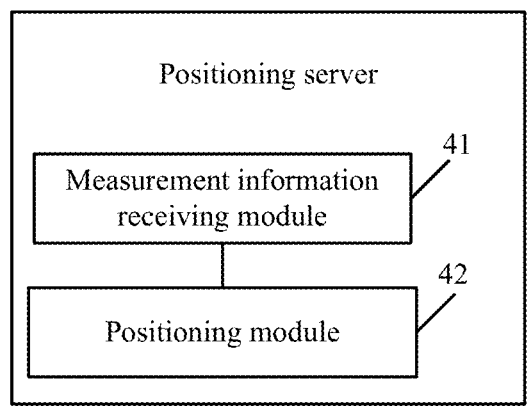
FIG. 13 is a schematic structural diagram of a positioning server according to an embodiment of the present disclosure.

FIG. 13 is a schematic structural diagram of a positioning server according to an embodiment of the present disclosure. As shown in FIG. 13, the positioning server in this embodiment of the present disclosure may include a measurement information receiving module 41 and a positioning module 42.

The measurement information receiving module 41 is configured to receive first measurement information and second measurement information, where the first measurement information includes a difference between a receiving time of the uplink signal and a sending time of the downlink signal, or the first measurement information includes a difference between a receiving time of the downlink signal and a sending time of the uplink signal, and the second measurement information is used to indicate a difference between an uplink subframe for carrying the uplink signal and a downlink subframe for carrying the downlink signal.

The positioning module 42 is configured to locate a terminal device based on the first measurement information and the second measurement information.

Further, in an optional embodiment, the measurement information receiving module 41 is further configured to receive third measurement information, where the third measurement information is used to indicate a distance between the base station and the terminal device, or the third measurement information is used to indicate a transmission time of the uplink signal and/or a transmission time of the downlink signal; and the positioning module 42 is further configured to locate the terminal device based on the third measurement information.

Further, it needs to be noted that, in an optional embodiment, the measurement information receiving module 41 may receive only the first measurement information and the third measurement information, or receive only the third measurement information; and the positioning module locates the terminal device based on the first measurement information and the third measurement information or based on the third measurement information.

Optionally, the second measurement information includes at least one of the following:

the uplink subframe and the downlink subframe;

a quantity of times of repeatedly carrying the uplink subframe;

a quantity of times of repeatedly carrying the downlink subframe;

the difference between the uplink subframe and the downlink subframe; and a configuration (UL/DL configuration) between the uplink subframe and the downlink subframe.

Further, optionally, the third measurement information includes a sum of the transmission time of the uplink signal and the transmission time of the downlink signal, the transmission time of the uplink signal, the transmission time of the downlink signal, and a round-trip distance between the base station and the terminal device or a one-way distance between the base station and the terminal device.

In this embodiment of the present disclosure, the measurement information receiving module 41 receives the first measurement information and the second measurement information, and the positioning module 42 locates the terminal device based on the first measurement information and the second measurement information, thereby improving positioning accuracy.

Figure 14:
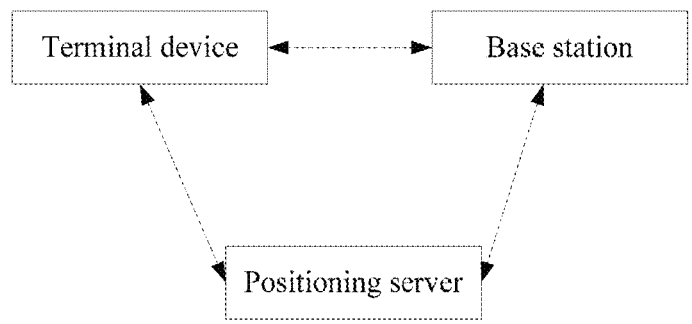
FIG. 14 is a schematic structural diagram of a positioning information transmission system according to an embodiment of the present disclosure.

FIG. 14 is a schematic structural diagram of a positioning information transmission system according to an embodiment of the present disclosure. As shown in FIG. 14, the system includes a base station, a terminal device, and a positioning server.

Specifically, refer to related description in the foregoing embodiments for the base station, the terminal device, and the positioning server. Details are not described herein again.

Figure 15:
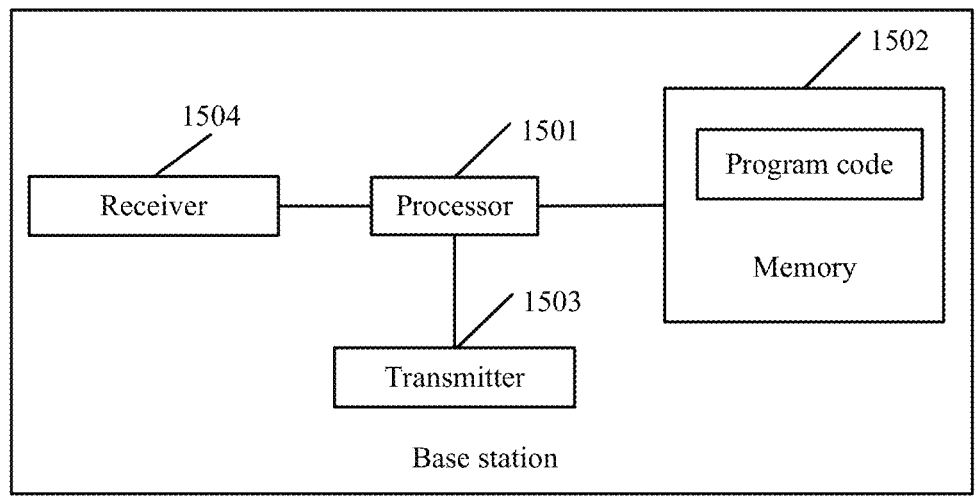
FIG. 15 is a schematic structural diagram of a base station according to still another embodiment of the present disclosure.

FIG. 15 is a schematic structural diagram of a base station according to an embodiment of the present disclosure. As shown in FIG. 15, the base station may include a processor 1501, a memory 1502, a transmitter 1503, and a receiver 1504. The memory 1502 may be a high-speed RAM memory, or may be a non-volatile memory (non-volatile memory), such as at least one magnetic disk memory. Optionally, the memory 1502 may be further at least one storage apparatus far away from the processor 1501.

The memory 1502 stores a set of program code, and the processor 1501 calls the program code stored in the memory to perform the following operations:

determining an uplink subframe for carrying an uplink signal;

determining a downlink subframe for carrying a downlink signal;

determining first measurement information, where the first measurement information includes a difference between a receiving time of the uplink signal and a sending time of the downlink signal, or the first measurement information includes a difference between a receiving time of the downlink signal and a sending time of the uplink signal;

determining second measurement information, where the second measurement information is used to indicate a difference between the uplink subframe and the downlink subframe; and sending the first measurement information and the second measurement information to a positioning server, for locating a terminal device by the positioning server.

Specifically, the base station described in this embodiment of the present disclosure may be configured to implement some or all processes in the method embodiments of the present disclosure that are described with reference to FIG. 2 to FIG. 9.

Figure 16:
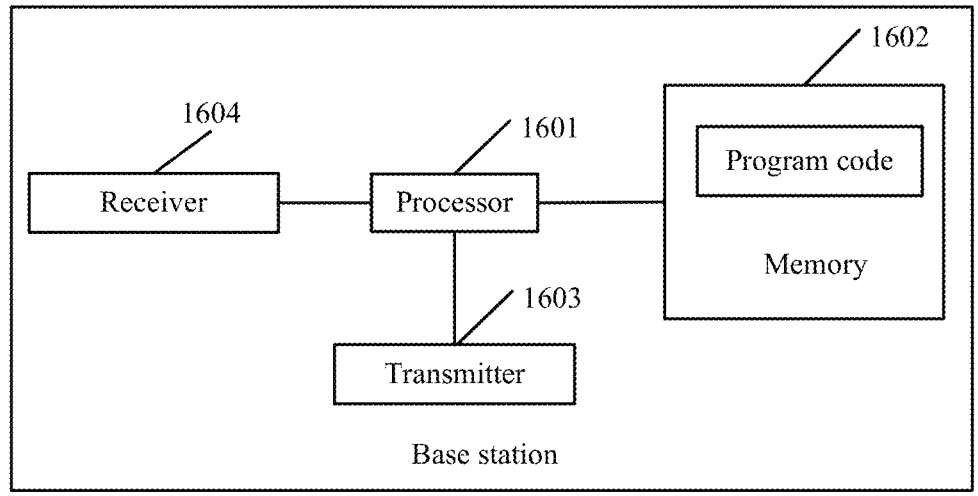
FIG. 16 is a schematic structural diagram of a base station according to yet another embodiment of the present disclosure.

FIG. 16 is a schematic structural diagram of a base station according to yet another embodiment of the present disclosure. As shown in FIG. 16, the base station may include a processor 1601, a memory 1602, a transmitter 1603, and a receiver 1604. The memory 1602 may be a high-speed RAM memory, or may be a non-volatile memory (non-volatile memory), such as at least one magnetic disk memory. Optionally, the memory 1602 may be further at least one storage apparatus far away from the processor 1601.

The memory 1602 stores a set of program code, and the processor 1601 calls the program code stored in the memory to perform the following operations:

determining third measurement information, where the third measurement information is used to indicate a distance between the base station and a terminal device, or the third measurement information is used to indicate a transmission time of an uplink signal and/or a transmission time of a downlink signal; and sending the third measurement information to a positioning server, for locating the terminal device by the positioning server.

Specifically, the base station described in this embodiment of the present disclosure may be configured to implement some or all processes in the method embodiments of the present disclosure that are described with reference to FIG. 2 to FIG. 9.

Figure 17:
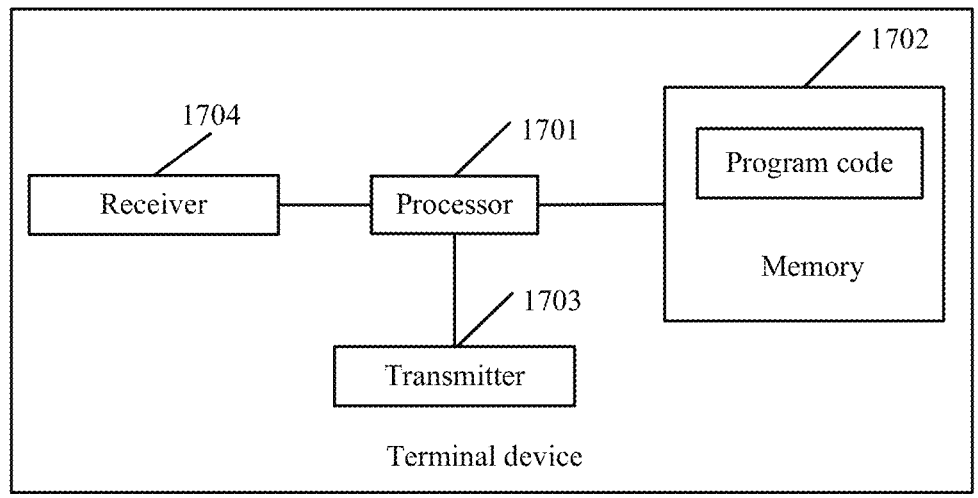
FIG. 17 is a schematic structural diagram of a terminal device according to another embodiment of the present disclosure.

FIG. 17 is a schematic structural diagram of a terminal device according to an embodiment of the present disclosure. As shown in FIG. 17, the terminal device may include a processor 1701, a memory 1702, a transmitter 1703, and a receiver 1704. The memory 1702 may be a high-speed RAM memory, or may be a non-volatile memory (non-volatile memory), such as at least one magnetic disk memory. Optionally, the memory 1702 may be further at least one storage apparatus far away from the processor 1701.

The memory 1702 stores a set of program code, and the processor 1701 calls the program code stored in the memory to perform the following operations:

determining first measurement information, where the first measurement information includes a difference between a receiving time of a downlink signal and a sending time of an uplink signal; and sending the first measurement information to a positioning server, for locating the terminal device by the positioning server.

Specifically, the terminal device described in this embodiment of the present disclosure may be configured to implement some or all processes in the method embodiments of the present disclosure that are described with reference to FIG. 2 to FIG. 9.

Figure 18:
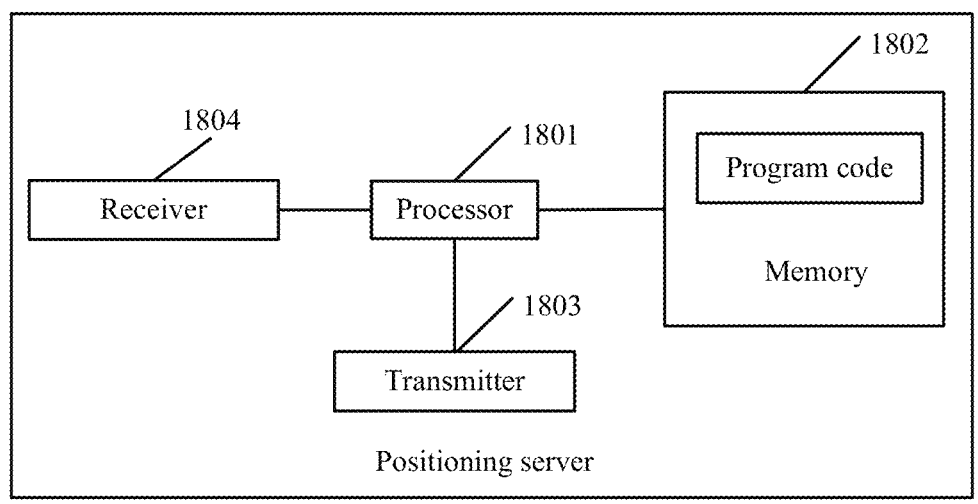
FIG. 18 is a schematic structural diagram of a positioning server according to another embodiment of the present disclosure.

FIG. 18 is a schematic structural diagram of a positioning server according to an embodiment of the present disclosure. As shown in FIG. 18, the positioning server may include a processor 1801, a memory 1802, a transmitter 1803, and a receiver 1804. The memory 1802 may be a high-speed RAM memory, or may be a non-volatile memory (non-volatile memory), such as at least one magnetic disk memory. Optionally, the memory 1802 may be further at least one storage apparatus far away from the processor 1801.

The memory 1802 stores a set of program code, and the processor 1801 calls the program code stored in the memory 1802 to perform the following operations:

receiving first measurement information and second measurement information, where the first measurement information includes a difference between a receiving time of the uplink signal and a sending time of the downlink signal, or the first measurement information includes a difference between a receiving time of the downlink signal and a sending time of the uplink signal, and the second measurement information is used to indicate a difference between an uplink subframe for carrying the uplink signal and a downlink subframe for carrying the downlink signal; and locating a terminal device based on the first measurement information and the second measurement information.

Specifically, the positioning server described in this embodiment of the present disclosure may be configured to implement some or all processes in the method embodiments of the present disclosure that are described with reference to FIG. 2 to FIG. 9.

In the description of this specification, descriptions about reference terms such as "an embodiment", "some embodiments", "an example", "a specific example", and "some examples" mean that specific features, structures, materials, or characteristics described with reference to the embodiments or examples are included in at least one embodiment or example of the present disclosure. In this specification, the foregoing example expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in this specification, as long as they do not conflict with each other.

In addition, the terms "first" and "second" are merely intended for a purpose of description, and shall not be understood as an indication or implication of relative importance or implicit indication of a quantity of indicated technical features. Therefore, a feature limited by "first" or "second" may explicitly or implicitly include at least one of the features. In the descriptions about the present disclosure, "a plurality of" means at least two, for example, two or three, unless otherwise specifically limited.

Descriptions about any process or method described in a flowchart or in another manner herein may be understood as indicating that one or more modules, segments, or parts of code that can execute an instruction and that is used to implement a specific logical function or a step of a process are included, a scope of preferred implementations of the present disclosure includes other implementation, and functions may be performed in a sequence other than a shown or discussed sequence, including a generally simultaneous manner or a reverse sequence according to the functions concerned. This should be understood by a person skilled in the technological field to which the embodiments of the present disclosure belong.

Logic and/or steps shown in the flowcharts or described herein in other manners, for example, may be considered as a program list of executable instructions that are used to implement logic functions, and may be specifically implemented on any computer-readable medium, for an instruction execution system, apparatus, or device (for example, a computer-based system, a system including a processor, or another system that can fetch instructions from the instruction execution system, apparatus, or device and execute the instructions) to use, or for a combination of the instruction execution system, apparatus, or device to use. In terms of this specification, the "computer-readable medium" may be any apparatus that may include, store, communicate, propagate, or transmit programs, for the instruction execution system, apparatus, or device to use, or for a combination of the instruction execution system, apparatus, or device to use. More specific examples (this list is not exhaustive) of the computer-readable medium include the following: an electrical portion (an electrical apparatus) with one or more buses, a portable computer cartridge (a magnetic apparatus), a random-access memory (RAM), a read-only memory (ROM), an electrically erasable programmable read-only memory (EPROM or flash memory), an optical fiber apparatus, and a compact disc read-only memory (CD-ROM). In addition, the computer-readable medium may even be a piece of paper on which the programs can be printed or another appropriate medium. Because, for example, optical scanning may be performed on the paper or the another medium, then processing, such as edition, decoding, or another appropriate means when necessary, may be performed to obtain the programs in an electronic manner, and then the programs are stored in a computer memory.

It should be understood that, various parts in the present disclosure may be implemented by using hardware, software, firmware, or a combination thereof. In the foregoing implementations, a plurality of steps or methods may be implemented by using software or firmware that is stored in a memory and that is executed by an appropriate instruction execution system. For example, if hardware is used for implementation, same as in another implementation, any item or a combination of the following well-known technologies in the art may be used for implementation: a discrete logic circuit having a logic gate circuit that is used to implement a logic function for a data signal, an application-specific integrated circuit having an appropriate combinatorial logic circuit, a programmable gate array (PGA), a field programmable gate array (FPGA), and the like.

A person of ordinary skill in the art may understand that all or some of the steps of the method embodiments may be implemented by a program instructing related hardware. The program may be stored in a computer readable storage medium. When the program runs, one or a combination of the steps of the method embodiments are performed.

In addition, functional units in the embodiments of the present disclosure may be integrated into one processing module, or each of the units may exist alone physically, or two or more units are integrated into one module. The integrated module may be implemented in a form of hardware, or may be implemented in a form of a software functional module. When the integrated module is implemented in the form of a software functional module and sold or used as an independent product, the integrated unit may be stored in a computer-readable storage medium.

The foregoing storage medium may be a read-only memory, a magnetic disk, an optical disk, or the like. Although the embodiments of the present disclosure are shown and described above, it can be understood that, the foregoing embodiments are examples, and cannot be construed as a limitation on the present disclosure. A person of ordinary skill in the art may make changes, modifications, replacement, and variations to the foregoing embodiments within the scope of the present disclosure.

What is claimed is:

1. A positioning information transmission method, wherein the method is applied to a base station, and the method comprises:
   determining an uplink subframe for carrying an uplink signal;
   determining a downlink subframe for carrying a downlink signal;
   determining, by the base station, first measurement information, wherein the first measurement information comprises a difference between a receiving time of the uplink signal and a sending time of the downlink signal;
   determining, by the base station, second measurement information, wherein the second measurement information indicates a difference between a subframe identifier of the uplink subframe and a subframe identifier of the downlink subframe; and
   determining third measurement information based on the first measurement information and the second measurement information, wherein the third measurement information indicates a distance between the base station and a terminal device, and the third measurement information is determined based on subtracting the second measurement information from the first measurement information; and
   sending the third measurement information to a positioning server, for locating the terminal device.

2. The method according to claim 1, wherein the second measurement information comprises at least one of the following:
   the uplink subframe and the downlink subframe;
   a quantity of repeat times of the uplink subframe;
   a quantity of repeat times of the downlink subframe;
   the difference between the uplink subframe and the downlink subframe; or
   a configuration between an uplink subframe and a downlink subframe.

3. A positioning information transmission method, wherein the method is applied to a terminal device, and the method comprises:
   determining first measurement information, wherein the first measurement information comprises a difference between a receiving time of a downlink signal and a sending time of an uplink signal;
   determining an uplink subframe for carrying the uplink signal;
   determining a downlink subframe for carrying the downlink signal;
   determining second measurement information, wherein the second measurement information indicates a difference between a subframe identifier of the uplink subframe and a subframe identifier of the downlink subframe; and
   determining third measurement information based on the first measurement information and the second measurement information, wherein the third measurement information indicates a distance between a base station and the terminal device, and the third measurement information is determined based on subtracting the second measurement information from the first measurement information; and
   sending the third measurement information to a positioning server, for locating the terminal device.

4. The method according to claim 3, wherein the second measurement information comprises at least one of the following:
   the uplink subframe and the downlink subframe;
   a quantity of repeat times of the uplink subframe;
   a quantity of repeat times of the downlink subframe;
   the difference between the uplink subframe and the downlink subframe; and
   a configuration between an uplink subframe and a downlink subframe.

5. The method according to claim 3, wherein before the sending the third measurement information to the positioning server, the method further comprises:
   sending identity information to the positioning server, wherein the identity information indicates that the terminal device has a capability of sending the third measurement information; and
   in response to receiving a measurement information obtaining request that is fed back by the positioning server in response to the identity information, sending the third measurement information to the positioning server.

6. A positioning information transmission method, wherein the method is applied to a positioning server, and the method comprises:
   receiving, by the positioning server, third measurement information from a terminal device, wherein the third measurement information indicates a distance between a base station and the terminal device, and the third measurement information is determined based on a difference between second measurement information and first measurement information, wherein the first measurement information comprises a difference between a receiving time of an uplink signal and a sending time of a downlink signal, or the first measurement information comprises a difference between a receiving time of a downlink signal and a sending time of an uplink signal, and the second measurement information indicates a difference between a subframe identifier of an uplink subframe carrying the uplink signal and a subframe identifier of a downlink subframe carrying the downlink signal; and locating the terminal device based on the third measurement information.

7. The method according to claim 6, wherein the second measurement information comprises at least one of the following:

the uplink subframe and the downlink subframe;

a quantity of times of repeatedly carrying the uplink subframe;

a quantity of times of repeatedly carrying the downlink subframe;

the difference between the uplink subframe and the downlink subframe; and a configuration between the uplink subframe and the downlink subframe.

8. A base station, comprising a processor, a memory, a transmitter, and a receiver, wherein the memory stores a set of program code, and the processor calls the program code stored in the memory to perform the following operations:

determining an uplink subframe for carrying an uplink signal;

determining a downlink subframe for carrying a downlink signal;

determining, by the base station, first measurement information, wherein the first measurement information comprises a difference between a receiving time of the uplink signal and a sending time of the downlink signal, or the first measurement information comprises a difference between a receiving time of the downlink signal and a sending time of the uplink signal;

determining, by the base station, second measurement information, wherein the second measurement information indicates a difference between a subframe identifier of the uplink subframe and a subframe identifier of the downlink subframe; and determining third measurement information based on the first measurement information and the second measurement information, wherein the third measurement information indicates a distance between the base station and a terminal device, and the third measurement information is determined based on subtracting the second measurement information from the first measurement information; and sending the third measurement information to a positioning server, for locating the terminal device.

9. A terminal device, comprising a processor, a memory, a transmitter, and a receiver, wherein the memory stores a set of program code, and the processor calls the program code stored in the memory to perform the following operations:

determining first measurement information, wherein the first measurement information comprises a difference between a receiving time of a downlink signal and a sending time of an uplink signal;

determining an uplink subframe for carrying the uplink signal;

determining a downlink subframe for carrying the downlink signal;

determining second measurement information, wherein the second measurement information indicates a difference between a subframe identifier of the uplink subframe and a subframe identifier of the downlink subframe; and determining third measurement information based on the first measurement information and the second measurement information, wherein the third measurement information indicates a distance between a base station and the terminal device, and the third measurement information is determined based on subtracting the second measurement information from the first measurement information; and sending the third measurement information to a positioning server, for locating the terminal device.

10. A positioning server, comprising a processor, a memory, a transmitter, and a receiver, wherein the memory stores a set of program code, and the processor calls the program code stored in the memory to perform the following operations:

receiving, by the positioning server, third measurement information from a terminal devise, wherein the third measurement information indicates a distance between a base station and the terminal device, and the third measurement information is determined based on a difference between second measurement information and first measurement information, wherein the first measurement information comprises a difference between a receiving time of an uplink signal and a sending time of a downlink signal, or the first measurement information comprises a difference between a receiving time of a downlink signal and a sending time of an uplink signal, and the second measurement information indicates a difference between a subframe identifier of the uplink subframe and a subframe identifier of the downlink subframe; and locating the terminal device based on the third measurement information.

* * * * *